United States Patent Office 3,413,333
Patented Nov. 26, 1968

3,413,333
AROMATIC AMINES
Ralph B. Davis, Notre Dame, Ind., assignor to University of Notre Dame, Notre Dame, Ind.
Original application Feb. 7, 1961, Ser. No. 87,569. Divided and this application Sept. 23, 1964, Ser. No. 401,757
18 Claims. (Cl. 260—471)

ABSTRACT OF THE DISCLOSURE

This disclosure relates to new aromatic amine compounds having the formula wherein Ar is a phenyl or naphthyl radical or derivative; Ar' is a 1,4-phenylene or 1,4-naphthylene radical or derivative thereof; R is hydrogen or an aliphatic or aromatic hydrocarbon group or derivative thereof; R' is one of the groups defined for R or one of a number of other groups defined hereinafter; and R and R' can be combined as a divalent group having both valencies attached to the same nitrogen atom. These compounds are characterized by the combination of aromatic and aliphatic amine functional groups.

---

Figure 1:
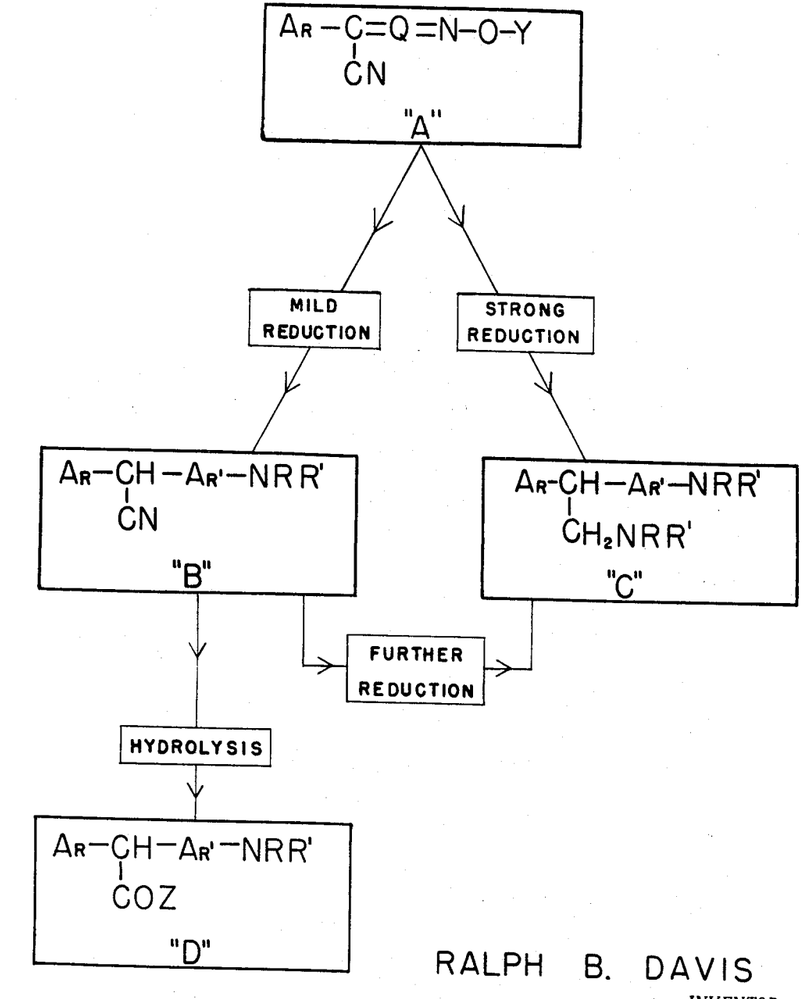

This application is a division of co-pending application Ser. No. 87,569, filed Feb. 7, 1961, now abandoned.

This invention relates to new aromatic amines and derivatives thereof. It also relates to the methods for the preparation of these new compounds.

The new compounds of this invention can be represented by the following formula:

wherein Ar is a phenyl or naphthyl radical, or a derivative thereof having one or two substituent groups thereon; Ar' is a 1,4-phenylene or 1,4-naphthylene radical, or a derivative thereof having one or two substituent groups thereon; the substituent groups on said Ar and Ar' radicals being selected from the class consisting of —Cl, —Br, —F, —I, —CN, —NR$_2$, —R, —OCOR, —COOR, —COOM, —OR, —OM, —CH$_2$NH$_2$, —CONR$_2$, —SO$_3$R and —SO$_3$M, wherein M is sodium or potassium and R is as subsequently defined; X is —CN, —CH$_2$NRR', or —COZ, wherein Z is —OR, —Cl, or —NRR'; R is hydrogen or an aliphatic or aromatic hydrocarbon group, including alkenyl and alkynyl groups; and R' is one of the groups defined as R or a sulfonyl or —CONHR group. No particular advantage is derived by having more than about 20 carbon atoms in any R or R' group in the compounds of this invention and generally it is preferred that such a group have no more than about 12 carbon atoms therein.

In accordance with the process of this invention these compounds can be prepared by the reduction of quinoid compounds having the formula:

disclosed and claimed in applicant's copending application Ser. No. 21,622, filed Apr. 12, 1960, now U.S. Patent 3,156,704, wherein Ar is an aromatic group, Q is a 1,4-quinoid group, and Y is a group selected from the class consisting of metals, hydrogen, and alkyl, alkenyl, alkynyl, acyl, and —CONHR, in which R is as defined above.

The process of this invention is illustrated by the accompanying flow sheet drawing. When the quinoid structure of the above formula "A" is reduced under mild conditions, e.g., without reduction of the nitrile group, the new compound B has X representing —CN. When the nitrile group is reduced simultaneously, e.g., by the use of strong reducing conditions, the new compound C has X representing —CH$_2$NRR'. When the cyano group is not reduced but is hydrolyzed, solvolyzed or otherwise treated as subsequently shown, the new compound D has X representing —COZ as defined above.

In these compounds the aromatic radicals can be unsubstituted, but substituent groups can also be present on the aryl nuclei, particularly where special modified properties are desired, including but not restricted to: —Cl, —Br, —I, —F, —CH$_3$, —C$_2$H$_5$, —OH, —ONa, —OK, —OCH$_3$, —OC$_2$H$_5$, —OCOCH$_3$, —CO$_2$CH$_3$, —CN, —CONH$_2$, —COOH, —COONa, —COOK, —SO$_3$H, —SO$_3$Na, —SO$_3$K, —NH$_2$, —CH$_2$NH$_2$,

—NHCH$_3$, —NHC$_2$H$_5$, —N(CH$_3$)$_2$, —N(C$_2$H$_5$)$_2$

—C$_6$H$_5$, —C$_6$H$_4$Cl, —C$_6$H$_4$CH$_3$, —C$_6$H$_4$OCH$_3$, etc., as well as other groups as listed subsequently for R and R'. The substituents attached to the aromatic nuclei can also be in the form of fused ring systems, including saturated and unsaturated systems, and systems containing nitrogen, oxygen and sulfur atoms. Additional substituents of the type indicated above can be attached to the fused ring part of these systems.

Illustrative examples of the monovalent groups represented by Ar in the above formula include, but are not restricted to: —C$_6$H$_5$, —C$_6$H$_4$Cl, —C$_6$H$_4$Br, —C$_6$H$_4$F,
—C$_6$H$_4$I, —C$_6$H$_3$Cl$_2$, —C$_6$H$_4$NH$_2$, —C$_6$H$_4$CN
—C$_6$H$_4$CH$_2$NH$_2$, —C$_6$H$_4$NHCH$_3$, —C$_6$H$_4$NHC$_2$H$_5$
—C$_6$H$_4$N(CH$_3$)$_2$, —C$_6$H$_4$COOH, —C$_6$H$_4$COOCH$_3$
—C$_6$H$_4$COOK, —C$_6$H$_4$COONa
—C$_6$H$_4$COOC$_2$H$_5$, —C$_6$H$_4$OH, —C$_6$H$_4$OK, —C$_6$H$_4$ONa,
—C$_6$H$_4$OCH$_3$, —C$_6$H$_4$OC$_2$H$_5$, —C$_6$H$_4$SO$_3$K
—C$_6$H$_4$SO$_3$Na, —C$_6$H$_4$SO$_3$H, —C$_6$H$_4$CONH$_2$
—C$_6$H$_4$OCOCH$_3$, —C$_6$H$_4$CH$_3$
—C$_6$H$_4$C$_2$H$_5$, —C$_6$H$_4$C$_3$H$_7$, —C$_6$H$_3$(CH$_3$)$_2$
—C$_6$H$_3$Cl(CH$_3$), —C$_6$H$_3$Cl(CN)
—C$_{10}$H$_7$, —C$_{10}$H$_9$, —C$_{10}$H$_{11}$, —C$_{10}$H$_5$Cl$_2$, —C$_{10}$H$_6$Cl,
—C$_{10}$H$_6$CH$_3$, —C$_{10}$H$_6$OCH$_3$, —C$_6$H$_4$C$_6$H$_5$
—C$_6$H$_4$C$_6$H$_4$CH$_3$, —C$_6$H$_4$C$_6$H$_4$Cl, etc.

Illustrative examples of the 1,4-bivalent groups represented by Ar' in the above formula include, but are not restricted to the following 1,4-radicals: —C$_6$H$_4$—,
—C$_6$H$_3$Cl—, —C$_6$H$_3$Br—, —C$_6$H$_3$I—, —C$_6$H$_3$F—
—C$_6$H$_2$Cl$_2$—, —C$_6$H$_3$OCH$_3$—, —C$_6$H$_3$OC$_2$H$_5$—
—C$_6$H$_3$OCOCH$_3$—, —C$_6$H$_3$CONH$_2$—, —C$_6$H$_3$CN—
—C$_6$H$_3$CH$_2$NH$_2$—, —C$_6$H$_3$COOH—, —C$_6$H$_3$COONa—
—C$_6$H$_3$COOK—, —C$_6$H$_3$COOCH$_3$—
—C$_6$H$_3$COOC$_2$H$_5$—, —C$_6$H$_3$NH$_2$—, —C$_6$H$_3$N(CH$_3$)$_2$—
—C$_6$H$_3$SO$_3$H—, —C$_6$H$_3$SO$_3$Na—, C$_6$H$_3$SO$_3$K—
—C$_6$H$_3$CH$_3$—, —C$_6$H$_3$C$_2$H$_5$, —C$_6$H$_3$C$_3$H$_7$—
—C$_6$H$_2$(CH$_3$)$_2$—, —C$_6$H$_2$(OCH$_3$)$_2$, —C$_6$H$_2$Cl(OCH$_3$)—
—C$_6$H$_2$Cl(CH$_3$)—, —C$_6$H$_3$C$_6$H$_4$, C$_{10}$H$_6$—, —C$_{10}$H$_5$Cl—
—C$_{10}$H$_5$F—, —C$_{10}$H$_5$BR—, —C$_{10}$H$_5$CH$_3$—
—C$_{10}$H$_5$OCH$_3$—, etc.

Illustrative examples of the groups that R in the above formulas can represent include, but are not restricted to: hydrogen, methyl, ethyl, propyl, isopropyl, butyl, secondary butyl, isobutyl, amyl, isoamyl, hexyl, heptyl, octyl, nonyl, decyl, dodecyl, allyl, methallyl, ethallyl, cyclopentyl, cyclopentenyl, cyclohexyl, cycohexenyl, benzyl, phenylethyl, phenylpropyl, propargyl, butynyl, pentynyl, hexynyl, phenyl, tolyl, naphthyl, diphenyl, ethylphenyl, etc.

Illustrative examples of the groups that R' in the above formulas can represent include, but are not restricted to: hydrogen, the hydrocarbon groups just previously cited under R, and also acyl as for example, HCO—,
$CH_3CO$—, $HOOCC_2H_4CO$—, $C_2H_5OOC_2H_2CO$—
$C_2H_5CO$—, $C_4H_9CO$—, $C_6H_5CO$—, $(HOOC)C_6H_4CO$—
$CH_3C_6H_4CO$—, etc., sulfonyl as for example, $C_6H_5SO_2$—, $CH_3C_6H_4SO_2$—, etc., and —CONHR' groups, such as for example, —$CONH_2$, —$CONHCH_3$, —$CONHC_4H_9$,
—$CONHC_2H_5$, —$CONHCH_2C_6H_5$, —$CONHC_6H_5$
—$CONHC_{10}H_7$, etc.

Illustrative examples of the groups that X in the above formulas can represent include, but are not restricted to: —CN, —$CH_2NRR'$, as for example, —$CH_2NH_2$,
—$CH_2NHCH_3$, —$CH_2NHC_2H_5$, —$CH_2N(CH_3)_2$
—$CH_2N(C_2H_5)_2$, —$CH_2NHC_3H_7$, —$CH_2NHC_4H_9$
—$CH_2NHCONH_2$, —$CH_2NHCONHC_4H_9$
—$CH_2NHCONHC_6H_5$, —$CH_2NHCONHC_{10}H_7$
—$CH_2N(CH_3)CONHC_4H_9$, —$CH_2N(C_2H_5)CONHC_6H_5$
etc., and —COOR as for example, —COOH, —$COOCH_3$, —$COOC_2H_5$, —$COOC_3H_7$, —$COOC_4H_9$, etc., and
—COCl, —$CONR_2$
as for example, —$CONH_2$, —$CONHCH_3$, —$CONHC_2H_5$, —$CONHC_3H_7$, —$CON(CH_3)_2$, —$CON(C_2H_5)_2$, etc., and also —CONRAr'', wherein Ar'' is an aromatic hydrocarbon radical of no more than 12 carbon atoms, as for example, —$CONHC_6H_5$, —$CONHC_{10}H_7$,
—$CON(CH_3)C_6H_5$
etc.

The chemical compounds of this invention have broad applications, and some of them can be used specifically as anti-oxidants, interfacial agents, for example, emulsifying agents, detergents and suspension agents, and as complexing agents for metals. Some of these new compounds are likewise useful in the production of dyes and resins. Furthermore, many of them can be used as chemical intermediates for the syntheses of drugs, insecticides, agricultural chemicals, plasticizers, polymer stabilizers, curing catalysts for convertible resins, and other useful purposes.

More specifically, 2-phenyl-2-p-aminophenyl-N,N-di-n-butyl ethyl amine is useful as an anti-oxidant additive in an aviation gasoline, retarding gum formation. A substituted Acid Orange A can be produced by diazotizing phenyl - p-aminophenylacetonitrile followed by coupling with 2-naphthol. A polymeric material which can be obtained by the co-condensation of the ethyl ester of phenyl-p-aminophenylacetic acid, aniline and formaldehyde and compounded in the usual manner with fillers and molded, exhibits greater plastic flow and better knitting of the molded piece than similar compositions in which the compound of this invention is omitted. Sulfonation of the dodecyl ester of phenyl-p-aminophenylacetic acid, followed by neutralizing the sulfonic acid with sodium hydroxide, or ammonia, or triethanol amine yields material which can be used as an interfacial agent, for example, as an emulsifying agent, detergent and suspension agent. The reactions of 2-phenyl-2-p-aminophenylethyl amine with dibasic acids produce polyamide resins which are more resistant to radiation degradation than corresponding polyamide resins made from purely aliphatic diamines.

A wide variety of chemical and catalytic methods can be employed to accomplish the reduction of the quinoid compounds A. Where it is desirable to produce the amino-nitriles B, mild reducing conditions are employed. For mild chemical reduction to the amino-nitriles I prefer to treat the quinoid compounds with at least an equivalent amount of reducing agents such as zinc, amalgamated zinc, tin, stannous chloride, iron, magnesium, amalgamated magnesium, aluminum, manganese, chromium, cobalt, nickel, lead, etc., in combination with acids such as acetic acid, formic acid, hydrochloric acid, sulfuric acid, phosphoric acid, etc., in the presence of suitable diluents such as methanol, ethanol, propanol, dioxane, methanol-water, ethanol-water, etc., at temperatures ranging from about 20° C. to about 100° C. For mild catalytic reduction to the amino-nitriles I prefer to use hydrogen and one of the heavy metal catalysts such as platinum, palladium, nickel, cobalt, etc., in the presence of suitable diluents such as methanol, ethanol, ether, tetrahydrofuran, dioxane, hexane, heptane, methanol-water, ethanol-water, etc., at pressures of about 15 lbs. per square inch to about 1000 lbs. or more per square inch and temperatures from room temperature to about 80° C. or higher. With the more active catalysts, the lower temperatures and pressures are sufficient to produce the desired reduction. With less active catalysts, the higher temperatures and pressures are employed.

It is pointed out that additional readily reducible groups present in the quinoid compounds A can likewise undergo reduction during the course of the reactions described, as for example a nitro group can also be reduced, fused ring systems can undergo partial reduction, etc.

Illustrative examples of the quinoid compounds that can be employed in the above reactions include, but are not restricted to the following:

$C_6H_5C(CN)=C_6H_4=NOH$, $C_6H_5C(CN)=C_6H_4=NONa$
$C_6H_5C(CN)=C_6H_4=NOK$,
$ClC_6H_4C(CN)=C_6H_4=NOH$
$ClC_6H_4C(CN)=C_6H_4=NOK$
$ClC_6H_4C(CN)=C_6H_4=NONa$
$BrC_6H_4C(CN)=C_6H_4=NOH$
$IC_6H_4C(CN)=C_6H_4=NOH$
$CH_3OC_6H_4C(CN)=C_6H_4=NOH$
$CH_3OC_6H_4C(CN)=C_6H_4=NOK$
$CH_2OC_6H_4C(CN)=C_6H_4=NONa$
$C_6H_5C(CN)=C_6H_3(CH_3)=NOH$
$C_6H_5C(CN)=C_6H_3(CH_3)=NOK$
$ClC_6H_4C(CN)=C_6H_3(CH_3)=NOH$
$CH_3OC_6H_4C(CN)=C_6H_3(CH_3)=NOH$
$C_6H_5C(CN)=C_6H_3(Cl)=NOH$
$C_6H_5C(CN)=C_6H_3(Cl)=NOK$
$C_6H_5C(CN)=C_6H_3(Cl)=NONa$
$ClC_6H_4C(CN)=C_6H_3(Cl)=NOH$
$CH_3OC_6H_4C(CN)=C_6H_3(Cl)=NOH$
$C_6H_5C(CN)=C_6H_3(OCH_3)=NOH$
$C_6H_5C(CN)=C_6H_3(OCH_3)=NOK$
$ClC_6H_4C(CN)=C_6H_3(OCH_3)=NOH$
$CH_3OC_6H_4C(CN)=C_6H_3(OCH_3)=NOH$
$C_6H_5C(CN)=C_6H_2(Cl)(CH_3)=NOH$
$ClC_6H_4C(CN)=C_6H_2(Cl)(CH_3)=NOH$
$CH_3OC_6H_4C(CN)=C_6H_2(Cl)(CH_3)=NOH$
$C_6H_5C(CN)=C_6H_2(CH_3)_2=NOH$
$ClC_6H_4C(CN)=C_6H_2(CH_3)_2=NOH$
$CH_3OC_6H_4C(CN)=C_6H_2(CH_3)_2=NOH$
$C_6H_5C(CN)=C_6H_2(OCH_3)_2=NOH$
$ClC_6H_4C(CN)=C_6H_2(OCH_3)_2=NOH$
$CH_3OC_6H_4C(CN)=C_6H_2(OCH_3)_2=NOH$
$C_6H_5C(CN)=C_6H_2(Cl)_2=NOH$
$ClC_6H_4C(CN)=C_6H_2(Cl_2)=NOH$
$CH_3OC_6H_4C(CN)=C_6H_2(Cl)_2=NOH$
$C_6H_5C(CN)=C_6H_2(Cl)(OCH_3)=NOH$
$ClC_6H_4C(CN)=C_6H_2(Cl)(OCH_3)=NOH$
$CH_3OC_6H_4C(CN)=C_6H_2(Cl)(OCH_3)=NOH$
$C_{10}H_7C(CN)=C_6H_4=NOH$
$C_{10}H_7C(CN)=C_6H_3(OCH_3)=NOH$
$C_{10}H_7C(CN)=C_6H_3(Cl)=NOH$
$C_{10}H_7C(CN)=C_6H_3(CH_3)=NOH$
$C_6H_5C(CN)=C_{10}H_6=NOH$
$ClC_6H_4C(CN)=C_{10}H_6=NOH$
$CH_3OC_6H_4C(CN)=C_{10}H_6=NOH$
$C_6H_5C_6H_4C(CN)=C_6H_4=NOH$
$C_6H_5C(CN)=C_6H_3C_6H_5=NOH$
etc.

Derivatives of the amino-nitriles of this invention can be prepared from the amino-nitriles by appropriate modifications of methods which are presently available to one skilled in the art for preparing similar derivatives of aniline and other amines. For example, the N-acyl derivatives of the amino-nitriles are prepared by treating the corresponding amino-nitriles with acid anhydrides. The urea derivatives are prepared by treating the amino-nitriles with isocyanates. The N-alkyl and N,N-dialkyl derivatives are prepared by treating the amino-nitriles with alkyl sulfates and alkyl halides, and so on.

Amino-acids corresponding to Formula D wherein R and R' are both hydrogen, and COZ is COOH, are prepared by hydrolysis of the corresponding amino-nitriles B. The hydrolysis can be acid-catalyzed or base-catalyzed.

However, for practical reasons, I prefer acid hydrolysis, and more particularly, I prefer treating the amino-nitriles with an excess of aqueous solutions of mineral acids such as sulfuric acid, hydrochloric acid, phosphoric acid, etc., in ranges from about 10% by weight to about 95% by weight of acid at temperatures from about 20° C. to about 120° C., followed by neutralization of the excess acid in order to aid isolation of the products.

Many variations in the above procedures can be employed. For example, by substituting alcohols, preferably primary alcohols, in place of water in the above reactions, amino-esters are prepared. By using N-alkyl and N,N-dialkyl amino-nitriles in place of the unsubstituted amino-nitriles in the above reactions, N-alkyl and N,N-dialkyl amino-acids and esters are prepared, and so on.

Illustrative examples of the amino nitriles that can be employed in the above hydrolysis reaction include, but are not restricted to the following:

Amino-acid derivatives of this invention are prepared from the amino-acids prepared as above. For example, an acid chloride of phenyl-p-aminophenylacetic acid is prepared by treating the N-acetyl derivative of the amino-acid with thionyl chloride. A large number of readily prepared derivatives can be made from the acid chloride.

Where it is desirable to produce the diamine derivatives C, strong reducing conditions capable of converting a cyano group to an amine group are used with either the quinoid compounds A or the amino-nitriles B being employed as the starting material. While strong chemical reducing agents can be used such as sodium, lithium, lithium aluminum hydride, etc., I prefer to use catalytic reductions, and more particularly I prefer to treat the quinoid compounds A and amino-nitriles B with hydrogen under pressures ranging from about 15 lbs. per square inch to about 1000–2000 lbs. or more per square inch in the presence of heavy metal catalysts as for example, platinum, palladium, nickel, cobalt, etc., and suitable diluents as for example, methanol, ethanol, propanol dioxane, methanol water, etc, at temperatures ranging from about 20° C. to about 150° C. or higher. With more active catalysts the lower temperatures and pressures are sufficient to produce the desired reduction. With less active catalysts, the higher pressures and ultimately the higher temperatures are used. When the quinoid compounds A are employed as starting material, I prefer initial temperatures below about 80° C., and advantageously where desirable raising the temperature to about 80°–150° C. after substantial intermediate reduction has taken place.

Many variations in the above procedures can be employed. For example, N-alkyl and N,N-dialkyl amino-nitriles can be used in place of the amino-nitriles, and the corresponding alkylated diamines are thus prepared. In some reactions, ammonia can be added to the reaction mixtures for purposes of improving the yields of the diamines. It is also apparent that other reducible groups when present can likewise be reduced under the conditions described, as for example an additional nitrile group or nitro group. Certain ring systems can undergo at least partial reduction, and so on.

Illustrative examples of the quinoid compounds A and the amino-nitriles B that can be used in the above reactions include, but are not restricted to those which were previously cited.

Derivatives of the diamines can be prepared from the diamines. For example the N,N'-diacetyl derivative of 2-phenyl-2-(p-aminophenyl)ethyl amine can be prepared by reacting the corresponding diamine with acetic anhydride.

In order to demonstrate various modifications in the manner in which this invention can be practiced, the following examples are given by way of illustration and not by way of limitation. Parts and percentages are parts and percentages by weight, unless otherwise indicated.

Example 1

To a reaction vessel containing 60 parts of phenylcyanomethylene quinone oxime, 500 parts of methanol and 60 parts of amalgamated zinc dust, is added in increments over one hour with stirring and cooling, 160 parts of acetic acid. The reaction mixture is then cautiously heated to reflux, and reflux and stirring are maintained for five hours. During this period 20 parts of amalgamated zinc dust and 40 parts of water are added in increments. The reaction mixture is cooled, filtered, and 1500 parts of water is added with stirring to the filtrate. The phenyl-p-aminophenylacetonitrile which settles to the bottom of the mixture is removed, washed with water, and after drying melts at 68–70° C. (99% yield). Upon recrystallization from benzene-petroleum ether (B.P. 61–70° C.), the product melts at 72° C.

Example 2

The procedure of Example 1 is repeated twice with similar results using an equivalent amount of tin and hydrochloride acid in one case, and also iron and hydrochloric acid in the other case in place of zinc and acetic acid. When ethanol, methanol-water and ethanol-water respectively are used in place of methanol in the above procedure, the same product is obtained. When the potassium salt of phenylcyanomethylene quinone oxime and the sodium salt of phenylcyanomethylene quinone oxime respectively are used in place of the phenylcyanomethylene quinone oxime in the above procedure, the same product is likewise obtained.

Example 3

Portions of the phenyl-p-aminophenylacetonitrile prepared in Example 1 are treated respectively with corresponding equivalent amounts of acetic anhydride, benzoyl chloride, benzenesulfonyl chloride, methyl sulfate, ethyl iodide, butyl isocyanate, phenyl isocyanate, and 1-naphthyl isocyanate, and there are obtained the N-acetyl, N-benzoyl, benzenesulfonamide, N-methyl, N,N-dimethyl, N-ethyl, N,N-diethyl, butyl urea, phenyl urea, and 1-naphthyl urea derivatives thereof.

Example 4

The procedures of Examples 1–3 are repeated using equivalent amounts of 2-methyl-4-(phenylcyanomethylene)-cyclohexa-2,5-diene-1-one oxime and its product in place of phenylcyanomethylene quinone oxime and its product, and there are obtained phenyl-(3-methyl-4-aminophenyl)acetonitrile (M.P. 108° C.) (96% yield) and its N-acetyl, N-benzoyl, benzenesulfonamide, N-methyl, N,N-dimethyl, N-ethyl, N,N-diethyl, butyl urea, phenyl urea and 1-naphthyl urea derivatives.

Example 5

The procedures of Examples 1–3 are repeated using equivalent amounts of 2-chloro-4-(phenylcyanomethylene)-cyclohexa-2,5-diene-1-one oxime and its product in place of phenylcyanomethylene quinone oxime and its product, and there are obtained phenyl-(3-chloro-4-aminophenyl)acetonitrile (M.P. 72–74° C., 96% yield) and its N-acetyl, N-benzoyl, benzenesulfonamide, N-methyl, N,N-dimethyl, N-ethyl, N,N-diethyl, butyl urea, phenyl urea, and 1-naphthyl urea derivatives.

Example 6

The procedures of Examples 1–3 are repeated using equivalent amounts of 2-methoxy-4-(phenylcyanomethylene)-cyclohexa-2,5-diene-1-one oxime and its product in place of phenylcyanomethylene quinone oxime and its product, and there are obtained phenyl-(3-methoxy-4-aminophenyl)acetonitrile (M.P. 53° C., 95% yield) and its N-acetyl, N-benzoyl, benzenesulfonamide, N-methyl, N,N-dimethyl, N-ethyl, N,N-diethyl, butyl urea, phenyl urea and 1-naphthyl urea derivatives.

Example 7

The procedures of Examples 1–3 are repeated using equivalent amounts of 4-(p-chlorophenylcyanomethylene)-cyclohexa-2,5-diene-1-one oxime and its product in place of phenylcyanomethylene quinone oxime and its product, and there are obtained p-chlorophenyl-p-aminophenylacetonitrile (M.P. 73° C., 88% yield) and its N-acetyl, N-benzoyl, benzenesulfonamide, N-methyl, N,N-dimethyl, N-ethyl, N,N-diethyl, butyl urea, phenyl urea and 1-naphthyl urea derivatives.

Example 8

The procedures of Examples 1–3 are repeated using equivalent amounts of 4-(p-methoxyphenylcyanomethylene)-cyclohexa-2,5-diene-1-one oxime and its product in place of phenylcyanomethylene quinone oxime and its product, and there are obtained p-methoxyphenyl-p-aminophenylacetonitrile (M.P. 135° C., 87% yield) and its N-acetyl, N-benzoyl, benzenesulfonamide, N-methyl, N,N-dimethyl, N-ethyl, N,N-diethyl, butyl urea and 1-naphthyl urea derivatives.

Example 9

The procedure of Example 1 is repeated using an equivalent amount of 3-chloro-4-(phenylcyanomethylene)-cyclohexa-2,5-diene-1-one oxime in place of the phenylcyanomethylene quinone oxime, and there is obtained phenyl - (4 - amino - 2-chlorophenyl)-acetonitrile (M.P. 97–99° C., 96% yield).

Example 10

The procedure of Example 1 is repeated using an equivalent amount of 3-methyl-4-(phenylcyanomethylene)-cyclohexa-2,5-diene-1-one oxime in place of the phenylcyanomethylene quinone oxime, and there is obtained phenyl - (4 - amino - 2-methylphenyl)-acetonitrile (M.P. 142° C., 93% yield).

Example 11

The procedure of Example 1 is repeated using an equivalent amount of 2-bromo-4-(phenylcyanomethylene)-cyclohexa-2,5-diene-1-one oxime in place of the phenylcyanomethylene quinone oxime, and there is obtained phenyl - (4 - amino - 3-bromophenyl)acetonitrile (M.P. 78° C., 94% yield).

Example 12

The procedure of Example 1 is repeated using an equivalent amount of 2,5-dichloro-4-(phenylcyanomethylene)-hexa-2,5-diene-1-one oxime, and there is obtained phenyl - (4-amino-2,5-dichlorophenyl)-acetonitrile (M.P. 132–134° C., 99% yield).

Example 13

The procedure of Example 1 is repeated using an equivalent amount of 2,3-dichloro-4-(phenylcyanomethylene)-cyclohexa-2,5-diene-1-one oxime in place of the phenylcyanomethylene quinone oxime, and there is obtained phenyl - (4-amino-2,3-dichlorophenyl)-acetonitrile (M.P. 121–123° C., 80% yield).

Example 14

The procedure of Example 1 is repeated using an equivalent amount of α-naphthylcyanomethylene quinone oxime in place of the phenylcyanomethylene quinone oxime, and there is obtained (α-naphthyl)-(p-aminophenyl)-acetonitrile (which for purposes of purification is isolated as the hydrochloride salt in 76% yield).

Example 15

The procedure of Example 1 is repeated using an equivalent amount of 4-(phenylcyanomethylene)-naphthoquinone-1 oxime in place of the phenylcyanomethylene oxime, and there is obtained phenyl-(4-aminonaphthyl)-acetonitrile (which for purposes of purification is isolated as the hydrochloride salt in 72% yield).

Example 16

An autoclave is charged with 10 parts of phenylcyanomethylene quinone oxime, 100 parts of methanol, 2 parts of a slurry of Raney nickel in water and hydrogen under a pressure of 900 lbs. per square inch. The reaction mixture is shaken at room temperature for two hours, the pressure is then released and the mixture is filtered. Upon removal of the methanol from the filtrate, there is obtained phenyl-p-aminophenylacetronitrile (89% yield).

When the potassium salt of phenylcyamethylene quinone oxime and the sodium salt of phenylcyanomethylene quinone oxime respectively are used in place of the phenylcyanomethylene quinone oxime in the above procedure, the same product is obtained.

Example 17

The procedure of Example 16 is repeated using an equivalent amount of 2-methyl-4-(phenylcyanomethylene)-cyclohexa-2,5-diene-1-one oxime in place of the phenylcyanomethylene quinone oxime, and there is obtained phenyl-(3-methyl-4-aminophenyl) - acetonitrile (85% yield).

Example 18

The procedure of Example 16 is repeated using an equivalent amount of p-chlorophenylcyanomethylene quinone oxime in place of the phenylcyanomethylene quinone oxime, and there is obtained p-chlorophenyl-p-aminophenylacetonitrile (88% yield).

Example 19

The procedure of Example 16 is repeated using an equivalent amount of 2-chloro-4-(p-chlorophenylcyanomethylene)-cyclohexa-2,5-diene-1-one oxime in place of the phenylcyanomethylene quinone oxime, and there is obtained p-chlorophenyl(4-amino-3-chlorophenyl)-acetonitrile (M.P. 102–104° C., 87% yield).

Example 20

The procedure of Example 16 is repeated using an equivalent amount of (p-phenylphenyl)-cyanomethylene quinone oxime in place of the phenylcyanomethylene quinone oxime, and there is obtained (p-phenylphenyl)-(p-aminophenyl)-acetonitrile, which for purposes of purification is isolated as the hydrochloride in 72% yield.

Example 21

In a suitable reaction vessel, 10 parts of phenyl-p-aminophenylacetonitrile prepared as in Example 1 and 100 parts of a 60% sulfuric acid solution in water are heated at about 100° C. for six hours. Upon cooling, neutralizing the excess acid and purifying the product, there is obtained phenyl-p-amino-phenylacetic acid in 78% yield, melting with decomposition at 175–177° C.

The above procedure is repeated using an equivalent amount of an 80% phosphoric acid solution in water in place of the sulfuric acid solution, and the same product is obtained. When the procedure is repeated using concentrated hydrochloric acid at reflux in place of the sulfuric acid solution at 100° C., similar results are obtained.

Example 22

The procedures of Example 21 are repeated using an equivalent amount of phenyl-(3-methyl-4-aminophenyl) acetonitrile in place of phenyl-p-aminophenyl-acetonitrile, and there is obtained phenyl-(3-methyl-4-aminophenyl) acetic acid, M.P. 149° C. dec., 69% yield.

Example 23

The procedures of Example 21 are repeated using an equivalent amount of phenyl-(3-chloro-4-aminophenyl) acetonitrile in place of phenyl-p-aminophenyl-acetonitrile, and there is obtained phenyl-(3-chloro-4-aminophenyl) acetic acid, M.P. 163–165° C. dec., 93% yield.

Example 24

The procedures of Example 21 are repeated using an equivalent amount of phenyl-(3-methoxy-4-aminophenyl) acetonitrile in place of phenyl-p-aminophenylacetonitrile, and there is obtained phenyl-(3-methoxy-4-aminophenyl) acetic acid, M.P. 139–141° C., 84% yield.

Example 25

The procedures of Example 21 are repeated using an equivalent amount of p-chlorophenyl-p-aminophenylacetonitrile, in place of phenyl-p-aminophenylacetonitrile, and there is obtained p-chlorophenyl-p-aminophenylacetic acid, M.P. 201–203° C. dec., 82% yield.

Example 26

The procedures of Example 21 are repeated using an equivalent amount of p-methoxyphenyl-p-aminophenylacetonitrile in place of phenyl-p-aminophenylacetonitrile, and there is obtained p-methoxyphenyl-p-aminophenylacetic acid, M.P. 190–192° C. dec., 78% yield.

Example 27

The procedures of Example 21 are repeated using an equivalent amount of phenyl-(4-amino-2-methylphenyl) acetonitrile in place of phenyl-p-aminophenylacetonitrile and there is obtained phenyl-(4-amino-2-methylphenyl) acetic acid, M.P. 208° C., 93% yield.

Example 28

An autoclave is charged with 10 parts of phenyl-p-aminophenylacetonitrile, 100 parts of methanol, 2 parts of a slurry of Raney nickel in water, 20 parts of ammonia and hydrogen under a pressure of 1000 lbs. per square inch. The reaction vessel is heated with shaking to 120° C., maintaining that temperature for 2 hours. After cooling and releasing the pressure, the contents are filtered. Upon removing the methanol and ammonia and purifying the product, there is obtained 2-phenyl-2-p-aminophenylethyl amine, M.P. 102–103° C., 90% yield.

When the above procedure is repeated, omitting, however, the ammonia, the same product is also obtained. When ethanol is used in place of methanol in the above procedure, the same amine is likewise produced.

Example 29

The procedure of Example 28 is repeated using an equivalent amount of phenyl-(3-methyl-4-aminophenyl) acetonitrile in place of the phenyl-p-amino-phenylacetonitrile, and there is obtained 2-phenyl-2-(3'-methyl-4'-aminophenyl)-ethyl amine, which for purposes of purification is isolated as the dihydrochloride, M.P. of the dihydrochloride 254–256° C., 93% yield.

Example 30

The procedure of Example 28 is repeated using an equivalent amount of phenyl-(3-chloro-4-aminophenyl) acetonitrile in place of the phenyl-p-aminophenylacetonitrile, and there is obtained 2-phenyl-2-(3'-chloro-4'-aminophenyl)-ethyl amine, which for purposes of purification is isolated as the hydrochloride in 68% yield.

Example 31

The procedure of Example 28 is repeated using phenyl-(3-methoxy-4-aminophenyl)acetonitrile in place of the phenyl-p-aminophenylacetonitrile, and there is obtained 2-phenyl-2-(3'-methoxy-4'-aminophenyl) - ethyl amine, which for purposes of purification is isolated as the dihydrochloride, M.P. of the dihydrochloride 213–215° C., 81% yield.

Example 32

The procedure of Example 28 is repeated using an equivalent amount of p-chlorophenyl-p-aminophenylacetonitrile in place of the phenyl-p-aminophenylacetonitrile, and there is obtained 2-p-chlorophenyl-2-p-aminophenylethyl amine, which for purposes of purification is isolated as the dihydrochloride, M.P. of the dihydrochloride 291–294° C., 32% yield.

Example 33

The procedure of Example 28 is repeated using an equivalent amount of p-methoxyphenyl-p-aminophenylacetonitrile in place of the phenyl-p-aminophenylacetonitrile, and there is obtained 2-p-methoxyphenyl-2-p-aminophenylethylamine, M.P. 88–89° C., 90% yield.

Example 34

A suitable reaction vessel is charged with 10 parts of phenylcyanomethylene quinone oxime, 100 parts of methanol, 2 parts of a slurry of Raney nickel in water and hydrogen under a pressure of 1000 lbs. per square inch. The vessel is then shaken for one hour at room temperature, the pressure is released, and 20 parts of ammonia is added to the reaction mixture. Hydrogen is again introduced under a pressure of 1000 lbs. per square inch. The vessel is then heated with shaking to 120° C., maintaining that temperature about 2 hours. After cooling and releasing the pressure, the mixture is filtered, the methanol and ammonia are removed, and the product, 2-phenyl-2-p-aminophenylethyl amine, is isolated and purified.

When the above procedure is repeated, omitting, however, the ammonia, the same product is also obtained. When the potassium salt of phenylcyanomethylene quinone oxime and the sodium salt of phenylcyanomethylene quinone oxime respectively are used in place of the phenylcyanomethylene quinone oxime in the above procedure, the same product is obtained.

Example 35

The procedure of Example 34 is repeated using an equivalent amount of 2-methyl-4-(phenylcyanomethylene) - cyclohexa-2,5-diene-1-one oxime in place of the phenylcyanomethylene quinone oxime, and there is obtained 2-phenyl-2-(3' - methyl - 4' - aminophenyl) - ethyl amine, isolated as the dihydrochloride.

Example 36

The procedure of Example 34 is repeated using an equivalent amount of 2-chloro-4-(phenylcyanomethylene)-cyclohexa-2,5-diene - 1 - one oxime in place of the phenylcyanomethylene quinone oxime, and there is obtained 2-phenyl-2-(3'-chloro - 4' - aminophenyl) - ethyl amine, isolated as the hydrochloride.

Example 37

The procedure of Example 34 is repeated using an equivalent amount of 2-methoxy-4-(phenylcyanomethylene) - cyclohexa-2,5-diene-1-one oxime in place of the phenylcyanomethylene quinone oxime, and there is obtained 2-phenyl-2-(3'-methoxy - 4' - aminophenyl) - ethyl amine, isolated as the dihydrochloride.

Example 38

The procedure of Example 34 is repeated using an equivalent amount of p-chlorophenylcyanomethylene quinone oxime in place of the phenylcyanomethylene quinone oxime, and there is obtained 2-p-chlorophenyl-2-p-aminophenylethyl amine, isolated as the dihydrochloride.

Example 39

The procedure of Example 34 is repeated using an equivalent amount of p-methoxyphenylcyanomethylene quinone oxime in place of the phenylcyanomethylene quinone oxime, and there is obtained 2-p-methoxyphenyl-2-p-aminophenyl ethyl amine.

Example 40

The procedure of Example 34 is repeated using an equivalent amount of 2 - bromo - 4-(phenylcyanomethylene) - cyclohexa-2,5-diene-1-one oxime in place of the phenylcyanomethylene quinone oxime, and there is obtained 2 - phenyl - 2 - (3'-bromo-4' - aminophenyl)ethyl amine, isolated as the hydrochloride.

Example 41

The procedure of Example 34 is repeated using an equivalent amount of (p-phenylphenyl)-cyanomethylene quinone oxime in place of the phenylcyanomethylene quinone oxime, and there is obtained 2-(p-phenylphenyl)-2-(p-aminophenyl)-ethyl amine, isolated as the dihydrochloride.

Example 42

Herein is described a general procedure for preparing acetyl derivatives of 2-(p-aminoaryl)-2-arylethylamines. A mixture of 0.10 mole of the appropriate 2-(p-aminoaryl)-2-arylethylamine, whose preparation has been previously described, 0.30 mole of acetic anhydride, 20 ml. of acetic acid and approximately 0.1 g. of zinc dust is heated at reflux in a suitable vessel. The mixture is then poured with stirring into another vessel containing about 250 g. of ice and 250 ml. of water. After standing for about four hours, the product is collected, washed with water and air-dried.

By way of illustration, the following compounds are prepared according to this general procedure:

N,N' - diacetyl - 2 - (4'-aminophenyl)-2-phenylethylamine, M.P. 90–91° C., 79% yield.

N,N' - diacetyl - 2 - (4'-amino-3'-methylphenyl)-2-phenylethylamine, M.P. 162–164° C., 76% yield.

N,N' - diacetyl - 2 - (4'-aminophenyl)-2-(4'-chlorophenyl)ethylamine, M.P. 152–154° C., 91% yield.

N,N' - diacetyl - 2 - (4'-aminophenyl)-2-(4'-methoxyphenyl)ethylamine, M.P. 149–151° C., 83% yield.

A modification of the above general procedure can be used to produce 2-(p-acetamidoaryl)-2-arylethylamines. When the appropriate p-aminoarylarylacetonitrile, whose preparation has been previously described, is used in place of the 2-(p-aminoaryl)-2-arylethylamine in the above procedure, there is obtained the corresponding p-acetamidoarylarylacetonitrile. Then 0.03 mole of the p-acetamidoarylarylacetonitrile, 120 ml. of methanol, 20 ml. of liquid ammonia, one teaspoon of Raney nickel and hydrogen under a pressure of about 1000 lbs. per square inch are charged to a suitable reaction vessel. The vessel is rocked and heated to about 70° C., maintaining this temperature for about two hours. The vessel is then cooled, and the product isolated. By way of illustration, the following compounds are prepared in the process of the modified procedures:

4-acetamidophenylphenylacetonitrile, M.P. 88–89° C., 84% yield.

4 - acetamidophenyl-3-methylphenylphenylacetonitrile, M.P. 129–131° C., 90% yield.

4 - acetamido-3-chlorophenylphenylacetonitrile, M.P. 95–97° C., 85% yield.

4 - acetamido-3-methoxyphenylphenylacetonitrile, M.P. 89–91° C., 89% yield.

4 - acetamidophenyl-4'-chlorophenylacetonitrile, M.P. 129–131° C., 88% yield.

4 - acetamidophenyl-4'-methoxyphenylacetonitrile, M.P. 127–129° C., 93% yield.

2 - (p-acetamidophenyl)-2-(p-methoxyphenyl) - ethylamine, M.P. 145–147° C., 53% yield.

Example 43

Herein is described a general procedure for the preparation of N,N' - bis(phenylcarbamyl)-2-(p-aminoaryl)-2-arylethylamines. A mixture of 0.05 mole of the appropriate 2-(p-aminoaryl)-2-arylethylamine, 75 ml. of tetrahydrofuran and 0.10 mole of phenylisocyanate is heated at reflux for about one-half hour in a suitable vessel. The mixture is then allowed to cool, and the prduct is isolated, washed and air-dried. By way of illustration, the following compounds are prepared according to this general procedure:

N,N,' - bis(phenylcarbamyl) - 2 - (4'-aminophenyl)-2-phenylethylamine, M.P. 196–198° C., 73% yield.

N,N' - bis(phenylcarbamyl) - 2 - (4'-amino-3'-methylphenyl) - 2 - phenylethylamine, M.P. 227–228° C., 78% yield.

N,N' - bis(phenylcarbamyl) - 2 - (4'-amino-3'-chlorophenyl)-2-phenylethylamine, M.P. 205–206° C., 91% yield.

N,N' - bis(phenylcarbamyl) - 2 - (4'-amino-3'-methoxyphenyl)-2-phenylethylamine, M.P. 225–226° C., 89% yield.

N,N' - bis(phenylcarbamyl) - 2 - (4'-aminophenyl)-2-(4'-methoxyphenyl)-ethylamine, M.P. 225–226° C., 94% yield.

N,N'-bis(phenylcarbamyl)-2-(4' - aminophenyl) - 2 - (4'-chlorophenyl) ethylamine, M.P. 217–218° C., 95% yield.

Example 44

Herein are described general procedures for preparing the bis(acid-succinamide) and the bis-succinimide derivatives of 2-(p-aminoaryl)-2-arylethylamines. To a boiling solution of 0.01 mole of succinic anhydride in 60 ml. of tetrahydrofuran is added a solution of 0.05 mole of the appropriate 2-(p-aminoaryl)-2-arylethylamine in 40 ml. of tetrahydrofuran. The mixture is then allowed to stand for four hours and then about 150 ml. of benzene is added with stirring. After about two additional hours, the product is collected, washed and air-dried. The bis-acid-succinamide derivative usually melts over a range apparently with decomposition. This product and 0.1 mole of acetyl choride are heated at reflux for about fifteen minutes. The reaction mixture is allowed to stand for about two hours. Then about 75 ml. of water is added cautiously. After an additional two hours, the bis-succinimide derivative is collected, washed with water and air-dried. By way of illustration, the following compounds are prepared by the procedures indicated:

2-acid-succinamido-1-(4'-acid-succinamidophenyl) - 1-phenylethane, melting range terminates at about 120° C.

1-phenyl-2-succinimido - 1 - (4' - succinimidophenyl)ethane, M.P. 202–204° C., 82% yield.

2-acid-succinamido-1-(4'-acid-succinamido-3' - methylphenyl)-1-phenylethane, melting range terminates about 130° C.

1-(3'-methyl-4'-succinimidophenyl)-1-phenyl - 2 - succinimidoethane, M.P. 213–215° C., 84% yield.

2-(acid-succinamido)-1-(4'-acid-succinamido-3' - chlorophenyl)-1-phenylethane, melting range terminates at about 140° C.

1-(3'-chloro-4'-succinimidophenyl)-1-phenyl - 2 - succinimidoethane, M.P. 212–214° C., 79% yield.

2-acid-succinamido-1-(4'-acid - succinamido - 3' - methoxyphenyl)-1-phenylethane, melting range terminates about 140° C.

1-(3'-methoxy-4'-succinimidophenyl)-1-phenyl-2 - succinimidoethane, M.P. 220–222° C., 76% yield.

2-acid-succinamido-1-(4'-acid-succinamidophenyl) - 1-(4'-chlorophenyl)ethane, melting range terminates about 130° C.

1-(4'-chlorophenyl)-2-succinimido - 1 - (4' - succinimidophenyl)ethane, M.P. 203–205° C., 81% yield.

2-acid-succinamido-1-(4'-acid-succinamidophenyl) - 1-(4'-methoxyphenyl)ethane, melting range terminates at about 150° C.

1-(4'-methoxyphenyl-2-succinimido-1-(4' - succinimidophenyl)ethane, M.P. 208–210° C., 78% yield.

Example 45

Herein is described a general procedure for preparing 2-(p-N-alkylaminoaryl)-2-arylethylamines. A suitable reaction vessel is charged with 0.075 mole of the appropriate arylcyanomethylene quinone oxime previously described, 0.15 mole of the appropriate aldehyde, 470 ml. of methanol, 0.018 mole of sodium acetate, one spoon of Raney nickel catalyst and hydrogen under a pressure of 170 lbs. per square inch. The vessel is rocked at room temperature for about four hours, then the Raney nickel is removed by filtration and the p-(N-alkylaminoaryl)arylacetonitrile is collected. A suitable reaction vessel is then charged with 0.025 mole of the appropriate p-(N-alkylaminoaryl)arylacetonitrile, 125 ml. of methanol, 5 ml. of liquid ammonia, one teaspoon of Raney nickel and hydrogen under a pressure of 1200 lbs. per square inch. The vessel is rocked and heated to about 60° C. for about three hours. The vessel is then allowed to cool, the Raney nickel is removed by filtration, and the 2-(p-N-alkylaminoaryl)-2-arylethylamine is collected. By way of illustration, the following compounds are prepared using the process described:

4-(N-ethylamino)phenyl - 4' - methoxyphenylacetonitrile, M.P. 117–118° C., 40% yield.

4-(N-n-butylamino)phenyl-4' - methoxyphenylacetonitrile, M.P. 86–88° C., 93% yield.

4-(N-benzylamino)phenyl - 4' - methoxyphenylacetonitrile, M.P. 134–135° C., 63% yield.

4-(N-benzylamino)phenyl-4' - chlorophenylacetonitrile, M.P. 115–116° C., 71% yield.

2-(4'-N'-ethylaminophenyl) - 2 - (4''-methoxyphenyl)-ethylamine, M.P. 81–82° C., 100% yield.

2-(4'-N'-n-butylaminophenyl)-2-(4'' - methoxyphenyl)-ethylamine, M.P. 61–62° C., 93% yield.

2-(4'-N'-benzylaminophenyl)-2-(4'' - methoxyphenyl)ethylamine, M.P. 93–95° C., 63% yield.

2-(4'-N'-benzylaminophenyl) - 2 - (4'' - chlorophenyl)ethylamine, M.P. 97–98° C., 56% yield.

Example 46

Herein is described another general procedure for preparing 2-(p-N-alkylaminoaryl)-2-arylethylamines. A mixture of 0.10 mole of the appropriate p-aminoarylarylacetonitrile previously described, 0.10 mole of the appropriate aldehyde and 400 ml. of methanol is heated at reflux for one hour. The mixture is cooled, and the Schiff base derivative is collected. Then 0.05 mole of the Schiff base derivative, 130 ml. of tetrahydrofuran, one spoon of Raney nickel and hydrogen under a pressure of about 850 lbs. per square inch are charged to a suitable reaction vessel. The reaction vessel is rocked and heated to about 60° C., maintaining that temperature for about three hours. The vessel is cooled, the Raney nickel removed by filtration, and the 2-(p-N-alkylaminoaryl)-2-arylethylamine is collected. By way of illustration, the following compounds are prepared in the course of such procedures:

4 - [N - (p - methoxy-benzylidene)amino]phenylphenylacetonitrile, M.P. 157–158° C., 82% yield.

4-[N-(p-methoxybenzylidene)amino]phenyl - 4' - methoxyphenylacetonitrile, M.P. 191–193° C., 82% yield.

4-[N-(p-methoxybenzylidene)amino]phenyl - 4' - chlorophenylacetonitrile, M.P. 164–166° C., 76% yield.

4-[N - (p - dimethylaminobenzylidene)amino]phenylphenylacetonitrile, M.P. 157–158° C., 86% yield.

4-[N-(p-dimethylaminobenzylidene)amino]phenyl - 4'-methoxyphenylacetonitrile, M.P. 136–138° C., 71% yield.

4-[N-(p-dimethylaminobenzylidene)amino]phenyl - 4'-chlorophenylacetonitrile, M.P. 139–140° C., 76% yield.

2-[4'-N'-(p - methoxybenzyl)aminophenyl] - 2 - (4''-chlorophenyl)ethylamine, M.P. 79–81° C., 63% yield.

2-[4'-N'-(p - dimethylaminobenzyl)aminophenyl] - 2-phenylethylamine, M.P. 82–84° C., 66% yield.

2-[4'-N'-(p - dimethylaminobenzyl)aminophenyl] - 2-(4''-methoxyphenyl)ethylamine, M.P. 106–108° C., 74% yield.

2-[4'-N'-(p-methoxybenzyl)aminophenyl] - 2 - phenylethylamine, M.P. 72–74° C., 65% yield.

2-[4'-N'-(p - methoxybenzyl)aminophenyl] - 2 - (4''-methoxyphenyl)ethylamine, M.P. 91–93° C., 35% yield.

2-[4'-N'-(p - dimethylaminobenzyl)aminophenyl] - 2-(4''-chlorophenyl)ethylamine, M.P. 121–123° C., 81% yield.

Example 47

Herein is described a general procedure for preparing N,N'-dialkyl-2-(p-aminoaryl)-2-arylethylamines. A mixture of 0.05 mole of the appropriate 2-p-aminoaryl-2-arylethylamine previously described, 0.10 mole of an appropriate aldehyde and 250 ml. of methanol is heated at reflux for one-half hour. This mixture is charged to a suitable reaction vessel along with 250 ml. of tetrahydrofuran, one spoon of Raney nickel and hydrogen under a pressure of about 1000 lbs. per square inch. The vessel is rocked at about 35° C. for about eight hours. The Raney nickel is removed by filtration and the solvents are stripped under reduced pressure. For purposes of purification the amine product is usually isolated as a salt. Alternately, the di-Schiff base derivative can be isolated before the reduction step. By way of illustration, the following compounds are obtained by these procedures:

N,N'-dibenzylidene - 2 - (4'-aminophenyl)-2-phenylethylamine, M.P. 122–123° C., 94% yield.

N,N'-bis(p-methoxybenzylidene) - 2 - (4'-aminophenyl)-2-phenylethylamine, M.P. 176–178° C., 95% yield.

N,N'-bis(p-methoxybenzyl) - 2 - (4'-aminophenyl)-2-phenylethylamine maleate salt, M.P. 148–149° C., 70% yield.

N,N'-bis(p-methoxybenzyl) - 2 - (4'-aminophenyl)-2-(4''-methoxyphenyl)ethylamine sesqui oxalate salt, M.P. 175–177° C., 58% yield.

N,N'-dibenzyl - 2 - (4'-aminophenyl)-2-phenylethylamine sesqui oxalate salt, M.P. 175–177° C., 54% yield.

N,N'-dibenzyl - 2 - (4'-aminophenyl)-2-(4"-methoxyphenyl)ethylamine maleate salt, M.P. 148–149° C., 76% yield.

Example 48

Herein is described a general procedure for preparing 2-[p-N-carbethoxyamino)aryl]-2-arylethylamines. A mixture of 0.1 mole of the appropriate p-aminoarylarylacetonitrile, previously described, dissolve in 200 ml. of tetrahydrofuran, 0.12 mole of ethylchloroformate and 50 ml. of a saturated aqueous sodium carbonate solution is stirred for four hours at room temperature. The p-N-carbethoxyaminoarylarylacetonitrile product is then collected. To a suitable reaction vessel is charged 0.05 mole of the p-N-carbethoxyaminoarylarylacetonitrile, 150 ml. of tetrahydrofuran, one teaspoon of Raney nickel and hydrogen under a pressure of about 900 lbs. per square inch. The vessel is rocked and heated at about 50° C. for about two hours. The vessel is cooled, the Raney nickel removed by filtration and the 2-[p-(N-carbethoxyamino)aryl]-2-arylethylamine is collected. For purposes of purification the product is sometimes isolated as a salt. By way of illustration the following compounds are prepared according to the procedures described:

4-(N-carbethoxyamino)phenylphenylacetonitrile, M.P. 69° C., 83% yield.

4-(N-carbethoxyamino)phenyl - 4'-methoxyphenylacetonitrile, M.P. 114–115° C., 91% yield.

4-(N-carbethoxyamino) - 3 - methylphenylphenylacetonitrile, M.P. 74–75° C., 88% yield.

4-(N-carbethoxyamino) - 3 - methoxyphenylphenylacetonitrile.

4-(N-carbethoxyamino)phenyl - 4' - chlorophenylacetonitrile, M.P. 95–96° C., 92% yield.

4-(N-carbethoxyamino)phenyl - 4' - chlorophenylacetonitrile, M.P. 95–96° C., 92% yield.

4-(N-carbethoxyamino) - 3 - chlorophenylphenylacetonitrile, M.P. 69–70° C., 93% yield.

2-(4' - N' - carbethoxyaminophenyl) - 2 - phenylethylamine, M.P. 93–95° C., 85% yield.

2-(4'-N'-carbethoxyaminophenyl) - 2 - (4"-methoxyphenyl)ethylamine oxalate salt, M.P. 92–97° C., 84% yield.

2-(4'-N'-carbethoxyamino-3'-methylphenyl) - 2 - phenylethylamine hemifumarate salt, M.P. 181° C., 69% yield.

2-(4' - N' - carbethoxyamino - 3' - methoxyphenyl)-2-phenylethylamine fumarate salt, M.P. 174° C., 52% yield.

2-(4'-N'-carbethoxyaminophenyl) - 2-(4"-chlorophenyl)ethylamine, hemifumarate salt, M.P. 155° C., 78% yield.

2-(4'-N'-carbethoxyamino - 3' - chlorophenyl)-2-phenylethylamine, hemifumarate salt, M.P. 169° C., 84% yield.

Example 49

Herein is described a general procedure for preparing N-β-diethylaminoethyl - 2 - (p-N-carbethoxyaminoaryl)-2-arylethylamines. A mixture of 0.04 mole of the appropriate 2-[p-(N-carbethoxyamino)aryl] - 2-arylethylamine just previously described, 100 ml. of benzene, 0.08 mole of powdered anhydrous potassium carbonate and 0.04 mole of powdered anhydrous β-diethylaminoethyl chloride hydrochloride is heated at reflux with stirring for about sixteen hours. The amine product is then isolated, usually as a salt for purposes of purification. By way of illustration, the following compounds are prepared according to this method:

N-(β-diethylaminoethyl) - 2 - (4'-N'-carbethoxyaminophenyl)-2-phenylethylamine dioxalate salt, M.P. 190–193° C., 41% yield.

N-(β-diethylaminoethyl) - 2 - (4'-N'-carbethoxyaminophenyl)-2-(4"-methoxyphenyl)ethylamine dioxalate salt, M.P. 180–181° C., 63% yield.

N-(β-diethylaminoethyl) - 2 - (4'-N'-carbethoxyamino-3'-methylphenyl)-2-phenylethylamine dioxalate salt, M.P. 177–178° C., 57% yield.

N-(β-diethylaminoethyl) - 2 - (4'-N'-carbethoxyamino-3'-methoxyphenyl) - 2 - phenylethylamine dioxalate salt, M.P. 165° C., 83% yield.

N-(β-diethylaminoethyl) - 2 - (4'-N'-carbethoxyaminophenyl) - 2 - (4"-chlorophenyl)ethylamine dioxalate salt, M.P. 169° C., 57% yield.

N-(β-diethylaminoethyl) - 2 - (4'-N'-carbethoxyamino-3'-chlorophenyl)-2-phenylethylamine dioxalate salt, M.P. 169–170° C., 42% yield.

Example 50

Herein is described a general procedure for preparing N,N' - bis(carbethoxy) - 2 - (p-aminoaryl) - 2 - arylethylamines. A mixture of 0.04 mole of the appropriate 2-(p-aminoaryl)-2-arylethylamine previously described, 150 ml. of tetrahydrofuran, 35 ml. of a saturated aqueous solution of sodium carbonate and 0.09 mole of ethylchloroformate is stirred at room temperature for about four hours, and then the bis(carbethoxy) derivative is collected. By way of illustration, the following compounds are prepared by this method:

N,N'-bis(carbethoxy)-2-(p-aminophenyl) - 2 - phenylethylamine, M.P. 92–94° C., 76% yield.

N,N'-bis(carbethoxy) - 2 - (p - aminophenyl)-2-(p-methoxyphenyl)ethylamine, M.P. 53–55° C., 95% yield.

N,N'-bis(carbethoxy)-2-(4'-amino - 3' - methoxyphenyl)-2-phenylethylamine, M.P. 69° C., 87% yield.

N,N'-bis(carbethoxy) - 2 - (p-aminophenyl)-2-(p-chlorophenyl)ethylamine, M.P. 106° C., 90% yield.

Example 51

Herein is described a general procedure for preparing N,N'-bis(β-diethylaminoethyl)-2-(p-aminoaryl) - 2 - arylethylamines. A mixture of 0.05 mole of the appropriate 2-(p-aminoaryl)-2-arylethylamine previously described, 100 ml. of benzene, 0.10 mole of β-diethylaminoethyl chloride hydrochloride and 0.1 mole of powdered anhydrous sodium carbonate is heated at reflux with stirring for sixteen hours. The product is then collected, and for purposes of purification, is usually isolated as a salt. By way of illustration, the following compounds are prepared according to this procedure:

N,N'-bis(β - diethylaminoethyl)-2-(p-aminophenyl)-2-phenylethylamine tri-oxalate salt, M.P. 96–100° C., 60% yield.

N,N'-bis(β-diethylaminoethyl) - 2-(p-aminophenyl)-2-(p-methoxyphenyl)ethylamine tri-oxalate salt, M.P. 112–115° C., 66% yield.

N,N'-bis(β-diethylaminoethyl) - 2 - (4'-amino-3'-methylphenyl)-2-phenylethylamine tri-oxalate salt, M.P. 129–134° C., 73% yield.

N,N'-bis (β-diethylaminoethyl) - 2 - (4' - amino - 3'-methoxyphenyl)-2-phenylethylamine tri-oxalate salt, 108–111° C., 71% yield.

N,N'-bis(β - diethylaminoethyl)-2-(4'-amino-3'-chlorophenyl)-2-phenylethylamine tri-oxalate salt, M.P. 126–128° C., 84% yield.

N,N'-bis(β-diethylaminoethyl)-2 - (p-aminophenyl)-2-(p-chlorophenyl)ethylamine tri-oxalate salt, M.P. 108–113° C., 74% yield.

Example 52

Herein is described a general procedure for preparing carbamyl derivatives of 2-(p - aminoaryl) - 2 - arylethylamines. To a solution of 0.1 mole of the appropriate 2-(p-aminoaryl)-2-arylethylamine previously described and 0.2 mole of acetic acid in 500 ml. of water is added a solution of 0.2 mole of potassium cyanate in 500 ml. of water. The resulting solution is allowed to stand at room temperature for about five hours. The products are then isolated. In the isolation process, sometimes both a mono- and a di-carbamyl derivative is obtained. By way of illustration, the following compounds are obtained using such procedures:

N,N'-bis(carbamyl)-2-(p-aminophenyl)-2 - phenylethylamine, M.P. 207–209° C., 48% yield.

N-carbamyl-2-(4'-aminophenyl)-2 - phenylethylamine, M.P. 170° C., 44% yield.

N,N'-bis(carbamyl) - 2 - (p - aminophenyl) - 2 - (p-methoxyphenyl)ethylamine, M.P. 191–194° C., 49% yield.

N,N'-bis(carbamyl)-2 - (4'-amino-3'-methylphenyl)-2-phenylethylamine, M.P. 218–220° C., 52% yield.

N-carbamyl-2-(4'-amino-3'-methylphenyl) - 2 - phenylethylamine, M.P. 140–142° C., 11% yield.

N,N'-bis(carbamyl) - 2 - (4'-amino-3'-methoxyphenyl)-2-phenylethylamine, M.P. 176–177° C., 71% yield.

N,N'-bis(carbamyl)-2-(p-aminophenyl)-2-(p - chlorophenyl)ethylamine, M.P. 178–182° C., 46% yield.

Example 53

Herein is described a general procedure for preparing β-hydroxyethyl derivatives of 2-(p-aminoaryl)-2-arylethylamines. A solution of 0.1 mole of the appropriate p-aminoarylarylacetonitrile previously described, 100 ml. of methanol and 0.4 mole of acetic acid is cooled to about 0° C., and then 0.5 mole of ethylene oxide is added. This mixture is allowed to come to room temperature and is allowed to stand for about two days. The products are then isolated. Sometimes in the isolation process, both a mono- and a di-β-hydroxyethyl derivative of the acetonitrile compound is obtained. Then there is charged to a suitable reaction vessel 0.05 mole of the β-hydroxyethyl derivative of the acetonitrile compound, 125 ml. of methanol, one spoon of Raney nickel and hydrogen under a pressure of about 1150 lbs. per square inch. The vessel is rocked and heated to about 70° C., maintaining that temperature for about four hours. The vessel is then cooled, the Raney nickel is removed by filtration and the β-hydroxyethyl derivative of the 2-(p-aminoaryl)-2-arylethylamine is collected. For purposes of purification the product is sometimes isolated as a salt.

Alternately, a solution of 0.1 mole of the appropriate 2-(p-aminoaryl)-2-arylethylamine, 150 ml. of methanol and 0.8 mole of acetic acid is cooled to about 0° C., and 1.0 mole of ethylene oxide is then added. After allowing the mixture to stand for about two days at room temperature, β-hydroxyethyl derivatives of the amine compound are isolated.

By way of illustration, the following compounds are obtained using the procedures described:

4 - N,N - bis(β - hydroxyethyl)aminophenylphenylacetonitrile, M.P. 89–90° C., 82% yield.

4 - N,N - bis(β - hydroxyethyl)aminophenyl - 4 - chlorophenylacetonitrile, M.P. 82–83° C., 85% yield.

4 - N,N - bis(β - hydroxyethyl)aminophenyl - 4' - methoxyphenylacetonitrile, M.P. 87° C. 71% yield.

4 - N - (β - hydroxyethyl)amino - 3 - methylphenylphenylacetonitrile, M.P. 87° C., 41% yield.

4 - N,N - bis(β - hydroxyethyl)amino - 3 - methylphenylphenylacetonitrile, identified by way of a derivative, M.P. of derivative 116–117° C.

4 - N - (β - hydroxyethyl)amino - 3 - methoxyphenylphenylacetonitrile, M.P. 60–62° C.

4 - N,N - bis(β - hydroxyethyl)amino - 3 - methoxyphenylphenylacetonitrile, identified as a derivative, M.P. of derivative 98–102° C.

N,N,N',N' - tetra(β - hydroxyethyl) - 2 - (p - aminophenyl) - 2 - phenylethylamine, isolated as an oxalate salt.

2 - [4' - N',N' - bis(β - hydroxyethyl)aminophenyl] - 2 - (p-methoxyphenyl)ethylamine, isolated as an oxalate salt.

Example 54

A suitable reaction vessel is charged with 10 g. of 4-aminonaphthyl-4'-chlorophenylacetonitrile (M.P. 138° C., prepared according to procedures previously described), 150 ml. of tetrahydrofuran, one teaspoon of Raney nickel and hydrogen under a pressure of about 700 lbs. per square inch. The vessel is rocked and heated at about 55° C., for about one hour. The vessel is cooled, the Raney nickel removed by filtration and the product is isolated as an oxalate salt. There is thus obtained 2(4'-aminonaphthyl)-2-(4''-chlorophenyl)ethylamine oxalate salt, M.P. 206° C., 73% yield.

Example 55

A suitable reaction vessel is charged with 10 g. of 4-aminophenyl-1'-naphthylacetonitrile (M.P. 99° C., prepared according to procedures previously described), 135 ml. of methanol, 15 ml. of liquid ammonia, one teaspoon of Raney nickel and hydrogen under a pressure of about 1000 lbs. per square inch. The vessel is rocked and heated at about 80° C. for about two hours. Isolation procedures yield 2 - (4' - aminophenyl)-2-(1''-naphthyl)ethylamine, M.P. 179° C.

Example 56

The procedure described in Example 31 is repeated. However, in the isolation process the free base is obtained, namely, 2 - (4' - amino-3'-methoxyphenyl)-2-phenylethylamine, M.P. 70–71° C., 85% yield.

Example 57

A suitable reaction vessel is charged with 60 g. of 4-amino - 3 - chlorophenylphenylacetonitrile previously described, 450 ml. absolute methanol, 30 ml. of liquid ammonia, one teaspoon of Raney nickel catalyst w–2 grade and hydrogen under a pressure of about 1000 lbs. per square inch. The vessel is rocked and heated at a temperature of about 66° C. for about two hours. Isolation techniques, including quantitative determinations with silver nitrate, indicate 74% of the material undergoes hydrogenolysis of chlorine.

A similar process is repeated, using 60 g. of 4-amino-3-chlorophenylphenylacetonitrile, 450 ml. of tetrahydrofuran, one teaspoon of Raney nickel catalyst w–2 grade and hydrogen under a pressure of about 1000 lbs. per square inch at a temperature of about 50° C. for about two hours. Isolation techniques give 2-(4'-amino-3'-chlorophenyl)-2-phenylethylamine in 72% yield, with no evidence of hydrogenolysis of chlorine.

Example 58

A suitable reaction vessel is charged with 111 g. of phenylcyanomethylene quinone oxime previously described, a solution of 20 g. of potassium hydroxide (assay 85%) in 400 ml. of methanol, two spoons of Raney nickel catalyst No. 28, and hydrogen under an initial pressure of about 1180 lbs. per square inch. The vessel is rocked and slowly heated to about 80° C., maintaining that temperature for about three hours. During the heating process, additional hydrogen is charged to the vessel so as to maintain a hydrogen pressure of about 800 lbs. per square inch as a minimum. There is then isolated 81 g. of 2-(4'-aminophenyl)-2-phenylethylamine (75% yield), M.P. 99–101° C.

When the above procedure is repeated, omitting, however, the potassium hydroxide and the phenylcyanomethylene quinone oxime, and using instead, the potassium salt of phenylcyanomethylene quinone oxime, the same product is obtained in good condition and in good yield.

Example 59

To a solution of 0.1 mole of 2-(p-aminophenyl)-2-acetonitrile previously described in 100 ml. of pyridine is added 0.12 mole of benzenesulfonyl chloride. The reaction mixture is maintained at a temperature of about 40–50° C., and is then poured into ice and water. After adding about 800 ml. of water, the product is obtained as an oil. The oil is treated with about 100 ml. of diethylamine, and there is obtained the diethyl amine salt of 4-(phenylsulfonamido)phenylphenylacetonitrile, M.P. 108–109° C., 81% yield.

Example 60

To a solution of 0.1 mole of 2-(p-aminophenyl)-2-phenylethylamine in 100 ml. of pyridine is added 0.22 mole of benzenesulfonyl chloride. The mixture is then maintained at a temperature of about 40–50° C. for about one hour, and is then poured into a mixture of ice and water. The product, N,N'-bis(phenylsulfonyl)-2-(p-aminophenyl)-2-phenylethylamine is collected in 78% yield.

The new compounds of the invention of this application can be represented by the following Formula C.:

(C)

wherein Ar is a phenyl or naphthyl radical, or a derivative thereof having one or two substituent groups thereon; Ar' is a 1,4-phenylene or 1,4-naphthylene radical, or a derivative thereof having one or two substuent groups thereon; the substituent groups on said Ar and Ar' radicals preferably being selected from the class consisting of —Cl, —Br, —I, —R" and —OR''', wherein R" is a hydrocarbon group of no more than 20 atoms and preferably a saturated primary aliphatic group having no more than about 5 carbon atoms therein, particularly methyl and ethyl, R''' is a hydrocarbon group of no more than 20 carbon atoms and preferably a saturated aliphatic hydrocarbon group having no more than about 5 carbon atoms therein, particularly methyl and ethyl; R is hydrogen or an aliphatic or aromatic hydrocarbon group, including alkenyl and alkynyl groups, or a β-hydroxyalkyl group having no more than about 5 carbon atoms therein, or is combined with R' as a bivalent radical, including resulting cyclic formations; R' is one of the groups defined as R above, or a carboxylic acyl group, or a carbamyl group, or (CH$_3$CH$_2$)$_2$NCH$_2$CH$_2$—, or an alkoxy-substituted benzyl group in which the alkoxy radical has no more than about 5 carbon atoms, or a dialkyl-aminobenzyl group in which the individual alkyl radicals have no more than about 5 carbon atoms, or a halo-substituted benzyl group, or an acetamidobenzyl group, or is combined with R as a bivalent radical including resulting cyclic formations, said bivalent radicals which R and R' may simultaneously represent being selected from the class of benzylidene radicals, di-carboxylic acyl radicals, polymethylene radicals and the —CH$_2$CH$_2$—O—CH$_2$—CH$_2$— group. No particular advantage is derived by having more than about 20 carbon atoms in any R or R' group or in any bivalent radical represented by R and R', and generally it is preferred that an R and R' group or any bivalent radical repersented by R and R' have no more than about 12 carbon atoms therein. Likewise, I prefer that the hydrocarbon groups represented by R and R' be of the aliphatic type, at least to the extent that the carbon atom attached directly to the nitrogen atom be of the aliphatic type.

The chemical compounds of this invention are characterized by the simultaneous combination of an aromatic and an aliphatic amine function assembled in a unique structure represented by the Formula C as defined above. For some purposes, as for example, when I desire modification of both the aromatic and the aliphatic amine functions, I prefer that at least one of the R groups attached to each nitrogen function be some group other than hydrogen.

For some useful purposes, it is important to me that the aliphatic amine function be unmodified. I find it important that the nitrogen function be attached to the Ar' group. However, I find that the nitrogen function attached to Ar' serves its useful purpose whether it is unmodified or modified by a wide variety of substituent groups. For these purposes, I prefer compounds as represented by the following Formula E.

(E)

wherein Ar, Ar', R and R' are as previously defined under C above.

Because of the ease with which substituent groups can be introduced onto the aromatic amine function, because of the wide variety of groups which can be so introduced, and because such a wide variety of groups produce the desired effect, it is essential that R and R' represent a wide variety of groups in the Formula E above. However, for practical reasons, primarily the costs and ease of preparation, I prefer that the R and R' groups, represented in Formula E above, contain no aliphatic carbon to carbon double bonds or triple bonds and are not involved in Schiff base linkages. Likewise I prefer that the hydrocarbon groups represented by R and R' be of the aliphatic type at least to the extent that the carbon atom attached directly to the nitrogen atom be of the aliphatic type. However, such groups can contain aromatic substituents, including non-hydrocarbon substituents. For similar reasons I prefer that the substituent groups attached to Ar and Ar', as represented in the Formula E above, be selected from the halo, lower primary alkyl and lower alkoxy groups. Furthermore, I find that a substituent group attached to Ar, in the Formula E above, is helpful in preventing or at least minimizing certain undesirable side effects. Hence I sometimes prefer that Ar carry a substituent group, and I particularly prefer that Ar represent a p-methoxyphenyl or p-chlorophenyl group.

For other purposes, as for example, when I desire no modification of either the aromatic or the aliphatic amine function, I prefer both the aliphatic and the aromatic amine functions be unsubstituted, and, moreover for these same purpose, I ordinarily prefer that no additional acidic or basic substituents be attached to Ar or Ar', as represented by the following Formula F:

(F)

wherein Ar and Ar' are as preivously defined under C above. For some special purposes, as for example, when I wish to avoid, or at least modify, certain undesirable side effects, I prefer the presence of at least one substituent group on Ar, and I particularly prefer that Ar represent a p-methoxyphenyl or a p-chlorophenyl group.

A variety of procedures are employed in the preparation of the compounds of this invention. However, in accordance with the process of this invention aromatic amine compounds having the formula:

(F)

wherein Ar and Ar' are as previously defined, can be prepared by the catalytic reduction of compounds having the formula:

(A)

disclosed and claimed in applicant's copending application Ser. No. 21,622 filed Apr. 12, 1960, now U.S. Patent 3,156,704, wherein Ar is an aromatic group, Q is a 1,4-quinoid group and Y is a group selected from the class consisting of metals, particularly sodium and potassium, hydrogen, alkyl, alkenyl, alkynyl, carboxylic acyl and carbamyl groups, but for practical reasons, since the Y group is removed in the reduction process, Y is preferably sodium, potassium or hydrogen, and particularly hydrogen.

In the compounds of this invention, represented by the Formulas C, E, and F above, the aromatic radicals Ar and Ar' can be unsubstituted, but substituent groups can also be present on the aryl and arylene nuclei Ar and Ar' as indicated above but for many purposes, particularly where special modified properties are desired. The following substituents are preferred: —Cl, —Br, —I, —R" such as —CH$_3$, —C$_2$H$_5$, —C$_3$H$_7$, —C$_4$H$_9$, —C$_5$H$_{11}$ etc., and —OR''' such as —OCH$_3$, —OC$_2$H$_5$, —OC$_3$H$_7$, —OC$_4$H$_9$, —CC$_5$H$_{11}$ etc.

Illustrative examples of preferred groups represented by Ar in the Formulas C, E, and F above include unless otherwise specified, but are not restricted to:

—C$_6$H$_5$, —C$_6$H$_4$Cl, —C$_6$H$_4$Br, —C$_6$H$_4$I, —C$_6$H$_3$Cl$_2$
—C$_6$H$_4$OCH$_3$, —C$_6$H$_4$OC$_2$H$_5$, —C$_6$H$_4$OC$_3$H$_7$, —C$_6$H$_4$CH$_3$
—C$_6$H$_4$C$_2$H$_5$, —C$_6$H$_3$(CH$_3$)$_2$, —C$_6$H$_3$Cl(CH$_3$)
—C$_6$H$_3$(OCH$_3$)$_2$, —C$_6$H$_3$Cl(OCH$_3$), —C$_{10}$H$_7$
—C$_{10}$H$_6$Cl, —C$_{10}$H$_6$Br, —C$_{10}$H$_6$I, —C$_{10}$H$_6$CH$_3$
—C$_{10}$H$_6$C$_2$H$_5$, —C$_{10}$H$_6$OCH$_3$, —C$_{10}$H$_6$OC$_2$H$_5$
—C$_{10}$H$_5$Cl$_2$, —C$_{10}$H$_5$Cl(CH$_3$), —C$_{10}$H$_5$(OCH$_3$)$_2$
—C$_{10}$H$_5$(CH$_3$)$_2$ etc.

Illustrative examples of preferred groups represented by Ar' in the Formulas C, E, and F above include unless otherwise specified, but are not restricted to:

—C$_6$H$_4$—, —C$_6$H$_3$Cl—, —C$_6$H$_3$Br—, —C$_6$H$_3$I—
—C$_6$H$_2$Cl$_2$—, —C$_6$H$_3$OCH$_3$—, —C$_6$H$_3$OC$_2$H$_5$—
—C$_6$H$_3$CH$_3$—, —C$_6$H$_3$C$_2$H$_5$, —C$_6$H$_3$(OCH$_3$)$_2$—
—C$_6$H$_2$(CH$_3$)$_2$—, —C$_6$H$_2$Cl(CH$_3$)—, —C$_6$H$_2$Cl(OCH$_3$)—
—C$_{10}$H$_6$—, —C$_{10}$H$_5$Cl—, —C$_{10}$H$_5$Br—, —C$_{10}$H$_5$I—
—C$_{10}$H$_5$CH$_3$—, —C$_{10}$H$_5$(OCH$_3$)—, —C$_{10}$H$_4$(OCH$_3$)$_2$—
—C$_{10}$H$_4$Cl(OCH$_3$)—, —C$_{10}$H$_4$Cl$_2$—, —C$_{10}$H$_4$(CH$_3$)$_2$—
—C$_{10}$H$_4$Cl(CH$_3$)— etc.

Illustrative examples of the groups that R in the above Formulas C and E can represent include unless otherwise specified, but are not restricted to: hydrogen, methyl, ethyl, propyl, isopropyl, butyl, secondary butyl, isobutyl, amyl, isoamyl, hexyl, heptyl, octyl, nonyl, decyl, dodecyl, allyl, methallyl, ethallyl, cyclopentyl, cyclopentenyl, cyclohexyl, cyclohexenyl, benzyl, methylbenzyl, ethylbenzyl, dimethylbenzyl, phenylethyl, phenylpropyl, propargyl, butynyl, pentynyl, hexynyl, phenyl, tolyl, naphthyl, methylnaphthyl, propylnaphthyl, cyclohexylphenyl, diphenyl, ethylphenyl, naphthylmethylene, β-hydroxyalkyl such as β-hydroxyethyl, β-hydroxypropyl, β-hydroxybutyl, etc., as well as in combination with R' constituting the divalent radicals subsequently illustrated, etc.

Illustrative examples of the groups that R' in the above Formulas C and E can represent include unless otherwise specified, but are not restricted to: hydrogen, the hydrocarbon groups and β-hydroxyalkyl groups just previously cited under R, (CH$_3$CH$_2$)$_2$NCH$_2$CH$_2$—, and carboxylic acyl having no more than 12 carbon atoms therein, such as CH$_3$CO—, C$_2$H$_5$CO—, C$_3$H$_7$CO—, C$_4$H$_9$CO—
C$_2$H$_5$OCO—, HOOCC$_2$H$_4$CO—, HOOCC$_2$H$_2$CO—
C$_6$H$_5$CO—, CH$_3$C$_6$H$_4$CO—, HOOCC$_6$H$_4$CO—
C$_6$H$_5$C$_2$H$_2$CO—, C$_6$H$_5$C$_2$H$_4$CO—, C$_2$H$_3$CO— etc., and alkoxy-, halo-, dialkylamino- and acetamido-substituted benzyl such as CH$_3$OC$_6$H$_4$CH$_2$—, C$_2$H$_5$OC$_6$H$_4$CH$_2$—
C$_5$H$_{11}$OC$_6$H$_4$CH$_2$—, Cl$_2$C$_6$H$_3$CH$_2$—, (CH$_3$O)$_2$C$_6$H$_3$CH$_2$—
BrC$_6$H$_4$CH$_2$—, IC$_6$H$_4$CH$_2$—, (C$_2$H$_5$)$_2$NC$_6$H$_4$CH$_2$—
ClC$_6$H$_4$CH$_2$—, (CH$_3$)$_2$NC$_6$H$_4$CH$_2$—
CH$_3$CONHC$_6$H$_4$CH$_2$ etc., and carbamyl having no more than 12 carbon atoms therein, such as —CONH$_2$, —CONHC$_4$H$_9$, —CONHC$_6$H$_{13}$
—CONHC$_6$H$_4$, —CONHC$_{10}$H$_7$ etc., as well as in combination with R constituting the divalent radicals subsequently illustrated, etc.

Illustrative examples of the divalent radicals which R and R' can simultaneously represent in the above Formulas C and E include unless otherwise specified but are not restricted to: benzylidene radicals such as C$_6$H$_5$CH=, CH$_3$OC$_6$H$_4$CH=, C$_2$H$_5$OC$_6$H$_4$CH=
ClC$_6$H$_4$CH=, CH$_3$C$_6$H$_4$CH=, BrC$_6$H$_4$CH=
(CH$_3$)$_2$NC$_6$H$_4$CH=, CH$_3$CONHC$_6$H$_4$CH= etc., and dicarboxylic acyl radicals such as

—COC$_2$H$_4$CO—, —COC$_2$H$_2$CO—, —COC$_6$H$_4$CO— etc., and polymethylene radicals such as

—CH$_2$CH$_2$—CH$_2$—CH$_2$— etc., and

—CH$_2$CH$_2$OCH$_2$CH$_2$— etc.

For practical reasons, whenever R or R' or both represent β-hydroxyalkyl groups in the Formulas C and E above, I prefer that the remaining R and R' groups, if any, do not simultaneously represent carboxylic acyl or carbamyl groups.

Furthermore, it is obvious to one skilled in the art that the various amine compounds represented by Formulas C, E, and F above may actually be isolated and used as their salts, as for example, their salts with hydrochloric acid, hydrobromic acid, sulfuric acid, sulfonic acids, acetic acid, butyric acid, oxalic acid, maleic acid, succinic acid, adipic acid, cinnamic acid, acetylsalicylic acid and other organic acids, etc. For the purposes of this invention, I consider the salts as the equivalent of the amine compounds.

The chemical compounds of this invention have broad applications, and some of them can be used specifically as anti-oxidants, as interfacial agents, for example, emulsifying agents, detergents and suspension agents, as polymer stabilizers, as curing catalysts for convertible resins, and as complexing agents for metals. Some of these new compounds are likewise useful in the production of dyes, resins, drugs, insecticides, agricultural chemicals, and other useful purposes.

More specifically, 2-(p-aminophenyl)-2-phenyl-N,N-di-n-butyl ethylamine is useful as an anti-oxidant additive in an aviation gasoline, retarding gum formation. In general, the compounds represented by Formula F above are good anti-oxidants. Alkylation of the amine functions preferably with small alkyl groups makes them better anti-oxidants, as for example, N,N,N',N'-tetramethyl-2-(p-aminophenyl)-2-(p-methoxyphenyl)ethylamine. 2-(p - N-dodecylaminophenyl) - 2 - p - methoxyphenylethylamine, preferably as a hydrochloride salt, is a useful emulsifying agent. The product derived from the alkylation of 2-(p-aminophenyl)-2-(p-chlorophenyl)ethylamine with chloroacetic acid serves as a complexing agent for metals.

In general, the compounds represented by the Formula F above are good stabilizers for polyethylene and polypropylene against sunlight degradation, as for example, 2-(p-aminophenyl)-2-(p-methoxyphenyl)ethylamine. This stabilizing activity is improved by alkylation of the amine groups preferably by methyl groups. Compounds represented by the Formula F above serve as excellent curing catalysts especially for epoxy type resins, particularly because they are high boiling, they co-react and become an integral part of the polymer, and because in the combination of the aliphatic and aromatic amine functions, they are capable of imparting the qualities of faster cure with better heat resistance, as for example, 2-(p-aminophenyl)-2-(p-chlorophenyl)ethylamine.

The N,N'-bis acrylyl-2-(p-aminophenyl)-2-(p-methoxyphenyl) ethylamine is an excellent cross-linking monomer. The N,N'-bis(cinnamoyl)-2-(p-aminophenyl)-2-(p-methoxyphenyl)ethylamine is a good light stabilizer, preventing discoloration of nylon, cotton and clear cellulose acetate film. The reactions of 2-(p-aminophenyl)-2-phenylethylamine with dibasic acids produce polyamide resins which are more resistant to radiation degradation than corresponding polyamide resins made from purely aliphatic diamines.

The amine activity of the compounds represented by F above can be delayed particularly in acidic and basic media by the introduction of certain substituent groups on the amine functions. The delayed action effect may be short or prolonged depending on the choice of substituents. With the Schiff base derivatives the delay is short, and with the acyl and carbamyl derivatives, the delay is prolonged. Hence, by the proper choice of compounds, it is possible to have immediate activity, slightly delayed activity, and long delayed activity. By the proper choice of mixtures of these compounds, it is possible to have both immediate and prolonged activity. Finally, many of the amine compounds of this invention are preferably used as their salts, particularly when aqueous media are involved. For the purposes of this invention, I consider the salts as the equivalent of the amines.

A variety of procedures are employed in the preparation of the compounds of this invention. When it is desirable to prepare the compounds represented by the Formulas F above, and hence the compounds represented by the Formula E above wherein R and R' are both hydrogen, one can employ the chemical process of this invention, namely, the reduction of the corresponding quinoid compounds represented by the Formula A above. For the reduction process, I prefer catalytic reduction, and more particularly, I ordinarily prefer to reduce the quinoid compound in the presence of a nickel catalyst, a diluent such as methanol, ethanol or tetrahydrofuran, the former are preferred when the sodium or potassium salt of the quinoid compound is reduced, and hydrogen under a pressure of about 700 lbs. to about 1500 lbs. per square inch, starting at about room temperature until about half of the reduction is completed and then heating to about 50–60° C., and sometimes higher, to about 120° C. as a maximum. Sometimes ammonia is added to the reaction mixture before it is heated, but never in the first stage of the reduction, otherwise there is extensive loss of the cyano group, resulting a different product being formed. For the same reason, ordinarily the reduction mixture is not heated at the start.

A particularly effective way of preparing 2-(p-aminophenyl)-2-phenylethylamine in good yield and in high purity, consists in reducing phenylcyanomethylene quinone oxime in the presence of about one equivalent more or less of potassium hydroxide dissolved in methanol, Raney nickel catalyst and hydrogen at a pressure of about 700 lbs. to about 1500 lbs. per square inch, starting at about room temperature and slowly heating to about 80° C. Alternately, in place of phenylcyanomethylene quinone oxime and potassium hydroxide, the potassium salt of phenylcyanomethylene quinone oxime can be used, which is the equivalent.

It is pointed out that additional readily reducible groups present in the quinoid compounds A can likewise undergo reduction during the course of the reactions described, as for example, a nitro group, an additional cyano group, an acetylene group, etc. Also certain halogen groups can undergo hydrogenolysis, particularly at higher temperatures, in the presence of the more polar diluents and in the presence of bases.

Illustrative examples of preferred quinoid compounds that can be employed in the above reactions include, but are not restricted to the following:

$C_6H_5C(CN)=C_6H_4=NOH$
$C_6H_5C(CN)=C_6H_4=NOK$
$C_6H_5C(CN)=C_6H_4=NONa$
$ClC_6H_4C(CN)=C_6H_4=NOH$
$BrC_6H_4C(CN)=C_6H_4=NOH$
$IC_6H_4C(CN)=C_6H_4=NOH$
$CH_3OC_6H_4C(CN)=C_6H_4=NOH$
$C_2H_5OC_6H_4C(CN)=C_6H_4=NOH$
$C_3H_4O-C_6H_4C(CN)=C_6H_4=NOH$
$CH_3C_6H_4C(CN)=C_6H_4=NOH$
$C_2H_5C_6H_4C(CN)=C_6H_4=NOH$
$(CH_3O)_2C_6H_3C(CN)=C_6H_4=NOH$
$Cl_2C_6H_3C(CN)=C_6H_4=NOH$
$(CH_3O)ClC_6H_3C(CN)=C_6H_4=NOH$
$(CH_3)_2C_6H_3C(CN)=C_6H_4=NOH$
$(CH_3)ClC_6H_3C(CN)=C_6H_4=NOH$
$C_{10}H_7C(CN)=C_6H_4=NOH$
$CH_3OC_{10}H_6C(CN)=C_6H_4=NOH$
$ClC_{10}H_6C(CN)=C_6H_4=NOH$
$CH_3C_{10}H_6C(CN)=C_6H_4=NOH$
$BrC_{10}H_6C(CN)=C_6H_4=NOH$
$(CH_3O)_2C_{10}H_5C(CN)=C_6H_4=NOH$
$Cl_2C_{10}H_5C(CN)=C_6H_4=NOH$
$(CH_3O)ClC_{10}H_5C(CN)=C_6H_4=NOH$
$C_6H_5C(CN)=C_6H_3OCH_3=NOH$
$CH_3OC_6H_4C(CN)=C_6H_3OCH_3=NOH$
$ClC_6H_4C(CN)=C_6H_3OCH_3=NOH$
$C_6H_5C(CN)=C_6H_3Cl=NOH$
$ClC_6H_4C(CN)=C_6H_3Cl=NOH$
$CH_3OC_6H_4C(CN)=C_6H_3Cl=NOH$
$C_6H_5C(CN)=C_6H_3Br=NOH$
$C_6H_5C(CN)=C_6H_3I=NOH$
$CH_3OC_6H_4C(CN)=C_6H_3Br=NOH$
$ClC_6H_4C(CN)=C_6H_3Br=NOH$
$CH_3OC_6H_4C(CN)=C_6H_3I=NOH$
$ClC_6H_4C(CN)=C_6H_3I=NOH$
$C_6H_5C(CN)=C_6H_3CH_3=NOH$
$CH_3OC_6H_4C(CN)=C_6H_3CH_3=NOH$
$ClC_6H_4C(CN)=C_6H_3CH_3=NOH$
$C_6H_5C(CN)=C_6H_3C_2H_5=NOH$
$ClC_6H_4C(CN)=C_6H_3C_2H_5=NOH$
$CH_3OC_6H_4C(CN)=C_6H_3C_2H_5=NOH$
$C_6H_5C(CN)=C_6H_2Cl_2=NOH$
$ClC_6H_4C(CN)=C_6H_2Cl_2=NOH$
$CH_3OC_6H_4C(CN)=C_6H_2Cl_2=NOH$
$C_6H_5C(CN)=C_6H_2(OCH_3)_2=NOH$
$ClC_6H_4C(CN)=C_6H_2(OCH_3)_2=NOH$
$CH_3OC_6H_4C(CN)=C_6H_2(OCH_3)_2=NOH$
$C_6H_5C(CN)=C_6H_2(CH_3)_2=NOH$
$ClC_6H_4C(CN)=C_6H_2(CH_3)_2=NOH$
$CH_3OC_6H_4C(CN)=C_6H_2(CH_3)_2=NOH$
$C_6H_5C(CN)=C_6H_2Cl(CH_3)=NOH$
$ClC_6H_4C(CN)=C_6H_2Cl(OCH_3)=NOH$
$CH_3OC_6H_4C(CN)=C_6H_2Cl(OCH_3)=NOH$
$C_6H_5C(CN)=C_{10}H_6=NOH$
$ClC_6H_4C(CN)=C_{10}H_6=NOH$
$CH_3O-C_6H_4C(CN)=C_{10}H_6=NOH$
$C_6H_5C(CN)=C_{10}H_5Cl=NOH$
$ClC_6H_4C(CN)=C_{10}H_5Cl=NOH$
$CH_3OC_6H_4(CN)=C_{10}H_5Cl=NOH$
$C_6H_5C(CN)=C_{10}H_5Br=NOH$
$CH_3OC_6H_4C(CN)=C_{10}H_5Br=NOH$
$ClC_6H_4C(CN)=C_{10}H_5I=NOH$
$CH_3OC_6H_4(CN)=C_{10}H_5CH_3=NOH$
$ClC_6H_4C(CN)=C_{10}H_5C_2H_5=NOH$
$C_6H_5C(CN)=C_{10}H_4Cl_2=NOH$
$ClC_6H_4C(CN)=C_{10}H_4Cl_2=NOH$
$CH_3OC_6H_4C(CN)=C_{10}H_4Cl_2=NOH$
$ClC_6H_4C(CN)=C_{10}H_4(OCH_3)_2=NOH$
$CH_3OC_6H_4C(CN)=C_{10}H_4(OCH_3)_2=NOH$
$C_6H_5C(CN)=C_{10}H_4Cl(OCH_3)=NOH$
$CH_3OC_6H_4C(CN)=C_{10}H_4Cl(OCH_3)=NOH$
$ClC_6H_4C(CN)=C_{10}H_4Cl(CH_3)=NOH$
$C_{10}H_7C(CN)=C_{10}H_6=NOH$, etc.

Alternately the diamine compounds represented by the Formulas F above can be prepared by the reduction of the corresponding amino-nitrile compounds B previously described. I prefer to reduce the amino-nitrile compounds in the presence of Raney nickel, a diluent such as methanol or tetrahydrofuran and hydrogen under a pressure of about 1000 lbs. per square inch starting at about room temperature and quickly heating to about 60° C. or more. Sometimes the reductions are accomplished in the presence of ammonia.

When it is desirable to prepare the compounds represented by the Formula E above a wide variety of procedures are available. Because of the large number of different steps involved and because the methods are available to one skilled in the art, these procedures are presented solely in summary form, and a number of them are demonstrated in the examples.

Compounds represented by the Formula E above wherein both R and R' are hydrogen, can be prepared by the strong reduction of arylcyanomethylene quinone oximes described in the other places in this application:

wherein Ar, Q, Y and Ar' are as previously defined. Illustrative of the examples of the quinoid compounds that can be employed in the above reductions are those listed above under the directions for preparing compounds represented by the Formula F, and others. Alternately these compounds can be prepared by the strong reduction of the p-aminoarylarylacetonitrile compounds as described in other places in this application.

Compounds represented by the Formula E above wherein R or R' or both are groups other than hydrogen can be prepared according to the following reaction scheme.

wherein Ar, Q, Y, Ar', R and R' have been previously defined and illustrated. Illustrative of the examples of the quinoid compounds that can be employed in the above reactions, are those listed above under the directions for preparing compounds represented by the Formula F above, and others. The mild reduction conditions, both chemical and catalytic are described and exemplified in other places in this application.

The techniques whereby the various transformations are accomplished in substituting a variety of R and R' groups in place of hydrogen on the aromatic amine function of the p-aminoarylarylacetonitrile compounds in the reaction scheme above are available to one skilled in the art. The same methods are used as are employed in substituting similar R and R' groups in place of hydrogen on the aromatic amine function of aniline or other aromatic amines having a replaceable hydrogen on the amine function. For example, various aliphatic groups including those containing aromatic substituents as well as other functional groups, can be substituted in place of hydrogen on the amine function of the p-aminoarylarylacetonitrile compounds by reacting these compounds with aliphatic halogen compounds. With the proper procedures, one or two aliphatic groups, alike or different may be introduced. Ordinarily I prefer the saturated aliphatic groups because unsaturated groups may be reduced in the subsequent reduction step. Various aliphatic groups which may also contain aromatic substituents as well as other functional groups can be introduced by reacting the p-aminoarylarylacetonitriles with aldehydes, followed by appropriate reduction of the resulting Schiff base derivatives. Alternately, the same effect is accomplished by subjecting the aminonitrile compound and the aldehyde compound to reductive amination. When aldehydes are used in introducing substituent groups, ordinarily only one such group should be so introduced, and it should be the first group introduced. Likewise, readily reducible groups can undergo reduction or hydrogenolysis in the course of the reduction procedures.

One or two β-hydroxyalkyl groups may be substituted in place of hydrogen on the aromatic amine function of the p-aminoarylarylacetonitrile compounds by appropriate treatment with ethylene oxide, propylene oxide, etc. Two such groups may be ring closed to the corresponding morpholine type compound prior to or at least subsequent to the reduction process. One β-hydroxyalkyl group may also be introduced in place of the remaining hydrogen in the N-mono-aliphatic type substituted p-aminoarylarylacetonitriles. However, when a β-hydroxyalkyl group is used as a substituent on the aromatic amine function, I prefer that the amine function contain no acyl or carbamyl substituents, primarily because of the difficulties in attempting to prepare such compounds.

Various carboxylic acyl groups may be substituted in place of hydrogen on the aromatic amine function by appropriate treatment of the p-aminoarylarylacetonitrile or the N-mono-aliphatic type substituted p-aminoarylarylacetonitrile compounds by appropriate treatment with organic acid anhydrides or organic acid halides. Ordinarily only one such group is substituted, and ordinarily no additional substitutions are made thereafter. Likewise, unsaturated linkages on other readily reducible functions may be reduced in the subsequent reduction step.

Various carbamyl groups may be substituted in place of hydrogen on the aromatic amine function of the p-aminoarylarylacetonitrile compounds or their mono-aliphatic type substituted derivatives by appropriate treatment with organic isocyanates or a combination of potassium cyanate and acetic acid.

And other transformations are possible as are available to one skilled in the art.

For the reduction of the N-mono and N,N-disubstituted p-aminoarylarylacetonitrile compounds, I prefer catalytic reduction, and, moreover, I ordinarily prefer to treat the substituted p-aminoarylarylacetonitrile compound with hydrogen under a pressure of about 700 lbs. to about 1500 lbs. per square inch in the presence of Raney nickel and a diluent such as methanol or tetrahydrofuran, starting at about room temperature and heating to about 60° C. more or less, or higher, and sometimes in the presence of ammonia, until the reduction is complete. As has been pointed out previously, any readily reducible groups present in the compounds may also undergo reduction, under certain conditions halo groups may undergo hydrogenolysis, and so on.

Compounds represented by the Formula C above wherein R and R' on the aliphatic nitrogen represent groups other than hydrogen may also be prepared by a variety of methods. One method to prepare them is to treat compounds represented by the Formula E above with reagents capable of replacing the hydrogen atoms in much the same manner as the hydrogen atoms of the aromatic nitrogen function are replaced. By using compounds represented by the Formula E above, groups which differ from the groups on the aromatic nitrogen can be introduced. Moreover, unsaturated groups and Schiff base type groups can also be introduced. By treating compounds represented by the Formula F above in a similar manner, similar substituent groups can be introduced at both the aliphatic and aromatic nitrogen functions, including unsaturated and Schiff base type groups. By taking advantage of the greater reactivity of the aliphatic nitrogen function, it is also possible to introduce groups solely at the aliphatic nitrogen function.

Illustrative of preferred amine compounds represented by the Formula C above, including many also represented by Formulas E and F above, that can be prepared according to the procedures described, include but are not restricted to the following:

$CH_3OC_6H_4CH(CH_2NH_2)$—$C_6H_3OCH_3$—$NH_2$
$C_6H_5CH(CH_2NH_2)$—$C_6H_3Cl$—$NH_2$
$C_6H_5CH(CH_2NH_2)$—$C_6H_3Br$—$NH_2$
$C_6H_5CH(CH_2NH_2)$—$C_6H_3I$—$NH_2$
$C_6H_5CH(CH_2NH_2)$—$C_6H_3CH_3$—$NH_2$
$C_6H_5CH(CH_2NH_2)$—$C_6H_3C_2H_5$—$NH_2$
$C_6H_5CH(CH_2NH_2)$—$C_6H_2(OCH_3)_2$—$NH_2$
$C_6H_5CH(CH_2NH_2)$—$C_6H_2(CH_3)_2$—$NH_2$
$C_6H_4CH(CH_2NH_2)$—$C_6H_2Cl(CH_3)$—$NH_2$
$C_6H_5CH(CH_2NH_2)$—$C_{10}H_6$—$NH_2$
$ClC_6H_4CH(CH_2NH_2)$—$C_{10}H_6$—$NH_2$
$CH_3OC_6H_4CH(CH_2NH_2)$—$C_{10}H_6$—$NH_2$
$CH_3OC_6H_4(CH_2NH_2)$—$C_{10}H_5CH_3$—$NH_2$
$C_6H_5CH(CH_2NH_2)$—$C_6H_4$—$NHC_2H_5$
$C_6H_5CH(CH_2NH_2)$—$C_6H_4$—$NHC_4H_9$
$C_6H_5CH(CH_2NH_2)$—$C_6H_4$—$N(C_2H_5)_2$
$C_6H_5CH(CH_2NH_2)$—$C_6H_4$—$N(CH_2CH_2OH)_2$
$CH_3OC_6H_4CH(CH_2NH_2)$—$C_6H_4$—$NHC_2H_5$
$CH_3OC_6H_4CH(CH_2NH_2)$—$C_6H_4$—$NHC_4H_9$
$CH_3OC_6H_4CH(CH_2NH_2)$—$C_6H_4$—$N(CH_2CH_2OH)_2$
$CH_3OC_6H_4CH(CH_2NH_2)$—$C_6H_4$—$NHCH_2CH_2OH$
$C_6H_5CH(CH_2NH_2)$—$C_6H_4$—$NHCH_2C_6H_5$
$C_6H_5CH(CH_2NH_2)$—$C_6H_4$—$NHCH_2C_6H_4OCH_3$
$C_6H_5CH(CH_2NH_2)$—$C_6H_4NHCH_2C_6H_4Cl$
$C_6H_5CH(CH_2NH_2)$—$C_6H_4$—$NHCH_2C_6H_4N(CH_3)_2$
$C_6H_5CH(CH_2NH_2)$—$C_6H_4$—$NHCH_2C_6H_4NHCOCH_3$
$CH_3OC_6H_4CH(CH_2NH_2)$—$C_6H_4$—$NHCH_2C_6H_4CH_3$
$ClC_6H_4CH(CH_2NH_2)$—$C_6H_4NHCH_2C_6H_5$
$ClC_6H_4CH(CH_2NH_2)$—$C_6H_4NHCH_2C_6H_4Cl$
$CH_3OC_6H_4CH(CH_2NH_2)$—$C_6H_4NHCH_2C_6H_5$
$CH_3OC_6H_4CH(CH_2NH_2)$—$C_6H_4NHCH_2C_6H_4OCH_3$
$CH_3OC_6H_4CH(CH_2NH_2)$—
$\qquad C_6H_4$—$NHCH_2C_6H_4N(CH_3)_2$
$CH_3OC_6H_4CH(CH_2NH_2)$—
$\qquad C_6H_4$—$NHCH_2CH_2N(C_2H_5)_2$
$C_6H_5CH(CH_2NH_2)$—$C_6H_4$—$NHCOCH_3$
$C_6H_5CH(CH_2NH_2)$—$C_6H_4$—$NHCOC_2H_5$
$C_6H_5CH(CH_2NH_2)$—$C_6H_4$—$NHCOOC_2H_5$
$C_6H_5CH(CH_2NH_2)$—$C_6H_4$—$NHCOC_4H_9$
$C_6H_5CH(CH_2NH_2)$—$C_6H_4$—$NHCOCH_2CH_2COOH$
$C_6H_5CH(CH_2NH_2)$—$C_6H_4$—$NHCOC_6H_4COOH$
$C_6H_5CH(CH_2NH_2)$—$C_6H_4$—$N(COCH_2CH_2CO)$
$ClC_6H_4CH(CH_2NH_2)$—$C_6H_4$—$NHCOCH_3$
$ClC_6H_4CH(CH_2NH_2)$—$C_6H_4$—$NHCOOC_2H_5$
$ClC_6H_4CH(CH_2NH_2)$—$C_6H_4$—$N(COCH_2CH_2CO)$
$CH_3OC_6H_4CH(CH_2NH_2)$—$C_6H_4$—$NHCOCH_3$
$CH_3OC_6H_4CH(CH_2NH_2)$—$C_6H_4$—$NHCOOC_2H_5$
$CH_3OC_6H_4CH(CH_2NH_2)$—
$\qquad C_6H_4$—$NHCOCH_2CH_2COOH$
$CH_3OC_6H_4CH(CH_2NH_2)$—$C_6H_4$—$N(COCH_2CH_2CO)$
$C_6H_5CH(CH_2NH_2)$—$C_6H_3OCH_3$—$NHCOOC_2H_5$
$C_6H_5CH(CH_2NH_2)$—$C_6H_3CH_3$—$NHCOOC_2H_5$
$C_6H_5CH(CH_2NH_2)$—$C_6H_4$—$NHCONH_2$
$C_6H_5CH(CH_2NH_2)$—$C_6H_4$—$NHCONHC_4H_9$
$C_6H_5CH(CH_2NH_2)$—$C_6H_4$—$NHCONHC_6H_5$
$C_6H_5CH(CH_2NHCOCH_3)$—$C_6H_4$—$NHCOCH_3$
$ClC_6H_4CH(CH_2NHCOCH_3)$—$C_6H_4$—$NHCOCH_3$
$CH_3OC_6H_4CH(CH_2NHCOCH_3)$—$C_6H_4$—$NHCOCH_3$
$C_6H_5CH(CH_2NHCOCH_3)$—$C_6H_3CH_3$—$NHCOCH_3$
$C_6H_5CH(CH_2NHCONHC_6H_4)$—$C_6H_4$—$NHCONHC_6H_5$
$CH_3OC_6H_4CH(CH_2NHCONHC_6H_5)$—
$\qquad C_6H_4$—$NHCONHC_6H_5$
$ClC_6H_4CH(CH_2NHCONHC_6H_5)$—
$\qquad C_6H_4$—$NHCONHC_6H_5$
$C_6H_5CH(CH_2NHCONHC_6H_5)$—
$\qquad C_6H_3Cl$—$NHCONHC_6H_5$
$C_6H_5CH(CH_2NHCONHC_6H_5)$—
$\qquad C_6H_3CH_3$—$NHCONHC_6H_5$
$C_6H_5CH(CH_2NHCONHC_6H_5)$—
$\qquad C_6H_3OCH_3$—$NHCONHC_6H_5$
$C_6H_5CH(CH_2NHCOCH_2CH_2CO_2H)$—
$\qquad C_6H_4$—$NHCOCH_2CH_2CO_2H$
$ClC_6H_4CH(CH_2NHCOCH_2CH_2CO_2H)$—
$\qquad C_6H_4$—$NHCOCH_2CH_2CO_2H$
$CH_3OC_6H_4CH(CH_2NHCOCH_2CH_2CO_2H)$—
$\qquad C_6H_4$—$NHCOCH_2CH_2CO_2H$
$C_6H_5CH(CH_2NHCOCH_2CH_2CO_2H)$—
$\qquad C_6H_3CH_3$—$NHCOCH_2CH_2CO_2H$
$C_6H_5CH(CH_2NHCOCH_2CH_2CO_2H)$—
$\qquad C_6H_3Cl$—$NHCOCH_2CH_2CO_2H$
$C_6H_5CH(CH_2NHCOCH_2CH_2CO_2H)$—
$\qquad C_6H_3OCH_3$—$NHCOCH_2CH_2CO_2H$
$C_6H_5CH(CH_2NCOCH_2CH_2CO)$—
$\qquad C_6H_4$—$N(COCH_2CH_2CO)$
$ClC_6H_4CH(CH_2NCOCH_2CH_2CO)$—
$\qquad C_6H_4$—$N(COCH_2CH_2CO)$
$CH_3OC_6H_4CH(CH_2NCOCH_2CH_2CO)$—
$\qquad C_6H_4$—$N(COCH_2CH_2CO)$
$C_6H_5CH(CH_2NCOCH_2CH_2CO)$—
$\qquad C_6H_3CH_3$—$N(COCH_2CH_2CO)$
$C_6H_5CH(CH_2NCOCH_2CH_2CO)$—
$\qquad C_6H_3Cl$—$N(COCH_2CH_2CO)$
$C_6H_5CH(CH_2NCOCH_2CH_2CO)$—
$\qquad C_6H_3OCH_3$—$N(COCH_2CH_2CO)$
$C_6H_5CH(CH_2N{=}CHC_6H_5)$—$C_6H_4$—$N{=}CHC_6H_5$,
$C_6H_5CH(CH_2N{=}CHC_6H_4OCH_3)$—
$\qquad C_6H_4$—$N{=}CHC_6H_4OCH_3$
$C_6H_5CH(CH_2NHCH_2C_6H_4OCH_3)$—
$\qquad C_6H_4$—$NHCH_2C_6H_4OCH_3$
$CH_3OC_6H_4CH(CH_2NHCH_2C_6H_4OCH_3)$—
$\qquad C_6H_4$—$NHCH_2C_6H_4OCH_3$
$C_6H_5CH(CH_2NHCH_2C_6H_5)$—$C_6H_4$—$NHCH_2C_6H_5$,
$CH_3OC_6H_4CH(CH_2NHCH_2C_6H_5)$—
$\qquad C_6H_4$—$NHCH_2C_6H_5$
$C_6H_5CH[CH_2NHCH_2CH_2N(C_2H_5)_2]$—
$\qquad C_6H_4$—$NHCO_2C_2H_5$
$ClC_6H_4CH[CH_2NHCH_2CH_2N(C_2H_5)_2]$—
$\qquad C_6H_4$—$NHCO_2C_2H_5$
$CH_3OC_6H_4CH[CH_2NHCH_2CH_2N(C_2H_5)_2]$—
$\qquad C_6H_4$—$NHCO_2C_2H_5$
$C_6H_5CH[CH_2NHCH_2CH_2N(C_2H_5)_2]$—
$\qquad C_6H_3CH_3$—$NHCO_2C_2H_5$
$C_6H_5CH[CH_2NHCH_2CH_2N(C_2H_5)_2]$—
$\qquad C_6H_3OCH_3$—$NHCO_2C_2H_5$
$C_6H_5CH[CH_2NHCH_2CH_2N(C_2H_5)_2]$—
$\qquad C_6H_3Cl$—$NHCO_2C_2H_5$
$C_6H_5CH(CH_2NHCO_2C_2H_5)$—$C_6H_4$—$NHCO_2C_2H_5$,
$ClC_6H_4CH(CH_2NHCO_2C_2H_5)$—$C_6H_4$—$NHCO_2C_2H_5$,
$CH_3OC_6H_4CH(CH_2NHCO_2C_2H_5)$—
$\qquad C_6H_4$—$NHCO_2C_2H_5$
$C_6H_5CH(CH_2NHCO_2C_2H_5)$—
$\qquad C_6H_3OCH_3$—$NHCO_2C_2H_5$
$C_6H_5CH[CH_2N(CH_2CH_2OH)_2]$—
$\qquad C_6H_4$—$N(CH_2CH_2OH)_2$
$C_6H_5CH[CH_2NHCH_2CH_2N(C_2H_5)_2]$—
$\qquad C_6H_4$—$NHCH_2CH_2N(C_2H_5)_2$
$CH_3OC_6H_4CH[CH_2NHCH_2CH_2N(C_2H_5)_2]$—
$\qquad C_6H_4$—$NHCH_2CH_2N(C_2H_5)_2$
$ClC_6H_4CH[CH_2NHCH_2CH_2N(C_2H_5)_2]$—
$\qquad C_6H_4$—$NHCH_2CH_2N(C_2H_5)_2$
$C_6H_5CH[CH_2NHCH_2CH_2N(C_2H_5)_2]$—
$\qquad C_6H_3CH_3$—$NHCH_2CH_2N(C_2H_5)_2$
$C_6H_5CH[CH_2NHCH_2CH_2N(C_2H_5)_2]$—
$\qquad C_6H_3OCH_3$—$NHCH_2CH_2N(C_2H_5)_2$
$C_6H_5CH[CH_2NHCH_2CH_2N(C_2H_5)_2]$—
$\qquad C_6H_3Cl$—$NHCH_2CH_2N(C_2H_5)_2$
$C_6H_5CH(CH_2NHCONH_2)$—$C_6H_4$—$NHCONH_2$,
$ClC_6H_4CH(CH_2NHCONH_2)$—$C_6H_4$—$NHCONH_2$,
$CH_3OC_6H_4CH(CH_2NHCONH_2)$—$C_6H_4$—$NHCONH_2$,
$C_6H_5CH(CH_2NHCONH_2)$—$C_6H_3CH_3$—$NHCONH_2$,
$C_6H_5CH(CH_2NHCONH_2)$—$C_6H_3OCH_3$—$NHCONH_2$,
$C_6H_5CH(CH_2NHCONH_2)$—$C_6H_4$—$NH_2$,
$C_6H_5CH(CH_2NHCONH_2)$—$C_6H_3CH_3$—$NH_2$, etc.

It should be readily apparent to one skilled in this art that the amine compounds represented by Formulas C, E and F above have an asymmetric carbon atom and that the methods of preparation described herein produce racemic mixtures of the optically active d- and l-compounds. When desired, the racemic mixtures of these compounds can be separated into the d and l isomers.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A new aromatic amine compound having the formula wherein Ar is a monovalent radical selected from the class consisting of phenyl and naphthyl and derivatives thereof having no more than two substituent groups thereon; Ar' is a divalent radical selected from the class consisting of 1,4-phenylene and 1,4-naphthylene and derivatives thereof having no more than two substituent groups thereon; said substituent groups on said Ar and Ar' radicals being selected from the class consisting of —Cl, —Br, —I, —R'', and —OR''', wherein R'' is a primary alkyl group having no more than five carbon atoms therein and R''' is an alkyl group having no more than five carbon atoms therein; R is a group selected from the class consisting of hydrogen, hydrocarbon groups having no more than twenty carbon atoms therein, and β-hydroxyalkyl groups having no more than five carbon atoms therein, and part of bivalent groups in combination with R'; and R' is a group selected from the class consisting of R groups, carboxylic acyl, carbamyl, alkoxy-substituted benzyl groups wherein the alkoxy radicals have no more than five carbon atoms, halo-substituted benzyl groups, dialkylaminobenzyl groups wherein the individual alkyl radicals have no more than five carbon atoms, and part of bivalent groups in combination with R; said bivalent groups simultaneously represented by R and R' being selected from the class consisting of benzylidene radicals, dicarboxylic acyl radicals, polymethylene radicals and —$CH_2CH_2OCH_2CH_2$—.

2. 2-(p-aminophenyl)-2-phenylethylamine.
3. 2-(p-aminophenyl)-2-(p-methoxyphenyl)ethylamine.
4. 2-(p-aminophenyl)-2-naphthylethylamine.
5. 2 - (p - N - carbethoxyaminophenyl) - 2 - (p - methoxyphenyl)ethylamine.
6. 2 - (p - acetamidophenyl) - 2 - (p - methoxyphenyl) ethylamine.
7. 2 - (p - N - ethylaminophenyl) - 2 - (p - methoxyphenyl)ethylamine.
8. 2 - (p - N - butylaminophenyl) - 2 - (p - methoxyphenyl)ethylamine.
9. 2 - (p - N - benzylaminophenyl) - 2 - (p - methoxyphenyl)ethylamine.
10. 2 - (p - N - benzylaminophenyl) - 2 - (p - chlorophenyl)ethylamine.
11. N - carbamyl - 2 - (p - aminophenyl) - 2 - phenylethylamine.
12. 2 - [4' - (p - methoxybenzylamino)phenyl] - 2-phenylethylamine.
13. 2 - (3' - methoxy - 4' - aminophenyl) - 2 - phenylethylamine.
14. 2 - (3' - methyl - 4' - N' - carbethoxyaminophenyl) - 2 - phenylethylamine.
15. 2 - 3' - methoxy - 4' - N' - carbethoxyaminophenyl) - 2 - phenylethylamine.
16. N,N' - bis(β - diethylaminoethyl) - 2 - (p - aminophenyl)-2-(p-chlorophenyl)ethylamine.
17. N,N' - bis(carbethoxy) - 2 - (p - aminophenyl) - 2-phenylethylamine.
18. N,N' - bis(p - methoxybenzyl) - 2 - (p - aminophenyl) - 2 - phenylethylamine.

References Cited

Journal American Chemical Society, Burger et al., vol. 72 (1950), pp. 5414 and 5415 relied on.

LORRAINE A. WEINBERGER, *Primary Examiner.*

L. A. THAXTON, *Assistant Examiner.*